United States Patent
Kil et al.

(10) Patent No.: US 7,570,617 B2
(45) Date of Patent: Aug. 4, 2009

(54) COMPLEX WIRELESS SERVICE APPARATUS USING WIRED AND WIRELESS COMMUNICATION SYSTEMS AND METHOD THEREOF

(75) Inventors: Tae-Young Kil, Seoul (KR); Gui-Jung Lee, Yongin-si (KR); Hyuk-Jin Ko, Yongin-si (KR); Jae-Hyeon Oh, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1017 days.

(21) Appl. No.: 10/776,517

(22) Filed: Feb. 12, 2004

(65) Prior Publication Data

US 2004/0196810 A1    Oct. 7, 2004

(30) Foreign Application Priority Data

Feb. 12, 2003  (KR) ................... 10-2003-0008930
Oct. 27, 2003  (KR) ................... 10-2003-0075254

(51) Int. Cl.
*H04W 4/00*   (2009.01)
*H04Q 7/20*   (2006.01)

(52) U.S. Cl. ................ 370/331; 455/432.1; 455/435.1; 455/440; 455/442

(58) Field of Classification Search ............... 370/331, 370/332, 338, 395.52; 455/436–437, 439, 455/442, 560–561, 552.1, 432.1, 433, 555, 455/435.1, 440
See application file for complete search history.

(56) References Cited

U.S. PATENT DOCUMENTS 5,987,331 A    11/1999  Grube et al.

(Continued)

FOREIGN PATENT DOCUMENTS

JP    08-140132    5/1996

(Continued)

OTHER PUBLICATIONS

Canadian Office Action corresponding to Canadian Patent Application No. 2,457,606, issued on Mar. 29, 2007.

(Continued)

*Primary Examiner*—Nguyen Vo
(74) *Attorney, Agent, or Firm*—Robert E. Bushnell, Esq.

(57) ABSTRACT

A complex wireless service apparatus using wired and wireless communication systems and a method thereof includes, when a call of the complex wireless terminal is not reachable, a call forwarding is automatically tried through another network by making a location of a service user to be registered automatically using the complex wireless terminal, and the service user can make a speech without any disconnection using a hand off between networks for the complex wireless terminal when the user moves from one network to another network during making a call. A home location register stores a database of a mobile communication phone number for the complex wireless terminal, whether an extension is located inside or outside, a public phone number, and a wireless terminal unique number. Moreover, in the case that there is an incoming request for the complex wireless terminal, when the complex wireless terminal is located in the premises, a mobile switching center tries the incoming using the public phone number of the complex wireless terminal and a wireless terminal unique number with reference to the home location register.

39 Claims, 17 Drawing Sheets

U.S. PATENT DOCUMENTS

| | | |
|---|---|---|
| 6,353,621 B1 | 3/2002 | Boland et al. |
| 6,359,896 B1 | 3/2002 | Baker et al. |
| 6,400,711 B1 | 6/2002 | Pounds et al. |
| 6,400,946 B1 | 6/2002 | Vazvan et al. |
| 6,424,639 B1 | 7/2002 | Lioy et al. |
| 2001/0034759 A1 | 10/2001 | Chiles et al. |
| 2001/0046859 A1* | 11/2001 | Kil ............................ 455/426 |
| 2002/0085516 A1 | 7/2002 | Bridgelall |
| 2003/0134650 A1* | 7/2003 | Sundar et al. ............... 455/465 |
| 2004/0087307 A1* | 5/2004 | Ibe et al. ..................... 455/436 |

FOREIGN PATENT DOCUMENTS

| | | |
|---|---|---|
| JP | 8-228384 | 9/1996 |
| JP | 2001-036963 | 2/2001 |
| JP | 2002-101469 | 4/2002 |
| JP | 2002-218544 | 8/2002 |
| JP | 2002-325049 | 11/2002 |
| JP | 2002-359875 | 12/2002 |
| WO | WO 98/11760 | 3/1998 |
| WO | WO 02/062094 | 8/2002 |

OTHER PUBLICATIONS

Japanese Office Action of the Japanese Patent Application No. 2004-035794, issued on Jun. 6, 2006.

European partial Search Report corresponding to European Patent Application No. 04003007.4-1249, issued on Aug. 20, 2007.

Japanese second Office action corresponding to Japanese Patent Application No. JP2004-035794, issued on Jul. 17, 2007.

Technical Specification XP002410542, 3GPP TS 23.234 V1.0.0(Sep. 2002), 3$^{rd}$ Generation Partnership Project corresponding to European Patent Application No. 04003007.4-1249), released on Sep. 2002.

* cited by examiner

COMPLEX WIRELESS SERVICE APPARATUS USING WIRED AND WIRELESS COMMUNICATION SYSTEMS AND METHOD THEREOF

CLAIM OF PRIORITY

This application makes reference to, incorporates the same herein, and claims all benefits accruing under 35 U.S.C. §119 from applications for COMPLEX WIRELESS SERVICE DEVICE USING WIRED OR WIRELESS COMMUNICATION SYSTEMS earlier filed in the Korean Intellectual Property Office on 12 Feb. 2003 and there duly assigned Serial No. 2003-8930, and for COMPLEX WIRELESS SERVICE APPARATUS USING WIRED AND WIRELESS COMMUNICATION SYSTEMS AND METHOD THEREOF earlier filed in the Korean Intellectual Property Office on Oct. 27, 2003 there duly assigned Serial No. 2003-75254.

BACKGROUND OF THE INVENTION

1. Field of the Invention

The present invention relates to a complex wireless service apparatus using wired and wireless communication systems and a method thereof wherein when a call of a complex wireless terminal is not reachable, a call forwarding is automatically tried through another network by making a position of a service user to be registered automatically using the complex wireless terminal, and the service user can make a speech without any disconnection using a hand off between networks for the complex wireless terminal when the user moves from one network to another network during making a call.

2. Description of the Related Art

The most common communication for the general public can be called a general wired telephone using a public telephone network.

Additionally, home communication equipment whose mobile usage is restricted to a user's residence started to appear in Korea from the end of 1970's, which is so-called a cordless phone.

This cordless phone has a usage frequency of 46/49 Mhz (megahertz), a common indoor reachable distance of about 50 m (meters), a channel gap of 25 Khz (kilohertz) and an FM (Frequency-Modulation) modulation scheme. It commonly uses an MCA (Multi Channel Access) scheme which can be called a request channel scheme from the middle of 1980's even though a fixed channel scheme was adopted in the earlier time.

A cordless phone of 900 Mhz bandwidth appeared taking an enhance of speech quality into account from the early 1990's.

The cordless phone which is modified to be used only in the residence by making the general phone operable in the wireless environment is called CT-1 (First Generation Cordless Phone).

The CT-1 cannot be used in a public place since it was devised for home usage. In order to improve such a problem, an originating dedicated mobile phone, so called CT-2 (Second Generation Cordless Phone) system was suggested for the first time in the United Kingdom in 1989 and adopted as a European standard in Europe. The CT-2 system is currently serviced in several countries and was serviced as a commercial service in Korea in the early 1997.

To directly express the property of the CT-2, it can be called a wireless public telephone for a pedestrian, which is used as the CT-1 at home and is used as a public phone in a public place which enables the user to make a speech within 200 m from the public telephone on walking.

A defect of the CT-2 is that there are no functions of call forwarding and handover. A CT-3 (Third Generation cordless Phone) appeared to supplement such a defect.

The CT-3 can be stated by classifying it into private and public network dimensions in accordance with its use, which can be explained centering around a PBX (Private Branch exchange) system in the private network dimension.

A communication system used for business in the existing building generally uses the PBX system and a system capable of mobile communication in a building by making the PBX system operable in a wireless environment is a wireless PBX which corresponds to many systems including a DECT (Digital European Cordless Telephone).

The DECT system regarded as a representative of the CT-3 was adopted as a European standard by ETSI (European Telecommunications Standards Institute) on March, 1992.

The main properties of this system are that its wireless connection is performed in a TDMA (Time-Division Multiple Access) scheme, its bandwidth is 2 Ghz (gigahertz), and a channel bandwidth is 1.73 Mhz so that each channel has 12 slots.

On developing the CT-3 system into a public network dimension by supplementing the system functions such as a handover and a roaming, a Low Tier PCS (Personal Communication Service) appeared, which is a personal communication realizing a personal communication enabling a user to make a speech regardless of whenever, wherever and with whomever and being evolved from the cordless phone.

The Low Tier PCS (Personal Communication Service) is a scheme by which pedestrian and indoor services can be provided on the basis of the cordless phone, such as DECT in Europe, PHS (Personal Hand-phone System) in Japan and PACS (Personal Access Communication Service) in the United States.

On the other hand, there is a High Tier PCS (Personal Communication Service) corresponding to the Low Tier PCS (Personal Communication Service), which becomes a micro cell developed from analog cellular technology in order to provide a service centered around a vehicle including a pedestrian.

The analog cellular which becomes a basis of the High Tier PCS (Personal Communication Service) was developed by AMPS (Advanced Mobile Phone Service) on October, 1983 with the aid of Bell Lab., one of its property is that it introduced a cell concept wherein its channel bandwidth is 30 kHz in 824 to 894 MHz and its modulation scheme is FM.

A system of the analog cellular mode is used as NMT (Nordic Mobile Telephone) and TACS (Total Access Cellular System) in Europe and as NTT method in Japan.

However, as such systems experience the capacity limitation as mobile communication subscribers are abruptly increased in the end of 1980, communication quality reduction due to the increase, and various requests for service, a method appears to improve the problems.

In order to improve the defects of the analog cellular such as a low capacity, low communication quality and limited data services, Korea developed narrowband CDMA (Code-Division Multiple Access) scheme and made a commercial service from early 1996, and United States standardized IS-95 CDMA on July, 1993 and also developed IS-54 TDMA scheme.

Also, GSM (Group Special Mobile) scheme first started in Europe in the end of 1992, which commercially used the TDMA in a pan-European style and had a property that it can be connected to each nation of Europe.

Japan commercialized a PDC (Public Digital Communication) scheme using the TDMA in early 1993.

However, such a digital cellular system does not seem to be a reasonable price for the public to have even though it seems to solve a quality of speech and a capacity to some degree. That is, the system does not seem to be improper for providing a general service.

Accordingly, the High Tier PCS (Personal Communication Service) seems to be evolved to make the digital vehicle mobile phone system to be generalized service and has merits that it provides high speed mobility and simple network construction, and can utilize the digital cellular technology.

The High Tier PCS (Personal Communication Service) system includes an Up-band IS-95 CDMA scheme evolved from the IS-95 CDMA and a DSC-1800 (Digital Communication System) scheme evolved from the GSM.

Though the development of PCS (Personal Communication Service) system can be divided into the High Tier PCS (Personal Communication Service) and Low Tier PCS (Personal Communication Service) as stated above, the High Tier scheme is recently being modified to accept the Low Tier scheme, and vice versa, so that the schemes are on a trend that they are integrated into an IMT-2000 (FPLMTS, Future Public Land Mobile Telecommunication System).

A communication network of the IMT-2000 is a network integrating wired and wireless communication services to be interconnected mutually, wherein many experts expect that an activation of a wireless Internet having the same transmission speed as that of a wired Internet can be visualized by constructing a network which can provide a low speed data transmission (14.4 kbps (kilobits per second)) being a wireless environment and a high speed data transmission (384 kbps).

Recently, various wired and wireless integration systems are being developed, which enable the wired and wireless integration service to be performed by integrating a wired network such as a public phone network and a wireless network such as a mobile communication network which have been already constructed as a post-stage of the IMT-2000.

Also, a mobile terminal (hereinafter, referred as a complex wireless terminal since it provides a plural band service and a plural mode service with a mobile terminal) supporting the plural band and plural mode is under the development in view of the mobile terminal. For example, there is a mobile terminal having dual band/dual mode which can provide a function of the mobile phone and a function of the mobile communication simultaneously.

The mobile terminal of the dual band/dual mode simultaneously providing the functions of wireless phone and mobile communication is called a dual bandwidth terminal since it can support both a frequency band used in wireless phone and a frequency band used in a mobile communication, and a dual mode terminal since it can support both a wireless phone mode and a mobile communication mode.

Besides them, there are a PCS/AMPS typed mobile terminal as the dual mode mobile terminal and a GSM900/GSM1800 as the dual band mobile terminal.

Such a plural band/plural mode mobile terminal can be operated in both single band/single mode and dual band/dual mode by a user's manual operation. Of course, it is possible to maintain a connection to a communication network which can guarantee a higher quality of speech in the case that there is transferred from a communication network to another communication network automatically.

Recently, there has been remarkably developed technology related to a wireless communication network and suggested many technology standards. Among them, Bluetooth technology standard and wireless LAN (Local Area Network) field are technology standards being spotlighted, which are closely related with the mobile terminal and produce a development of the mobile terminal of the plural band/plural mode.

However, a conventional method using the complex wireless terminal having the plural band/plural mode has a problem that when a network failed to receive a call a receiver has to retry a call establishment to another network since the networks were separated.

Therefore, services in a shadowed area, a basement and in-house are sometimes deteriorated in the cases of CDMA, GSM and WCDMA (Wideband Code Division Multiple Access) which provide broadband service areas so that repeaters should be installed for those places with separate expenses.

Though the communication systems such as WLAN and BLUETOOTH providing services in narrow areas can provide a good quality of services with low expenses, their service areas are not wide and their mobility is limited so that it is necessary to develop technology for enlargement of service area and guarantee of mobility.

Also, there is a problem that when a user of the complex wireless terminal having the plural band/plural mode moves from a general public phone network to a mobile communication network during making a call, or from the mobile communication network to the general public phone network, a speech is disconnected since a handoff is not provided between the two networks.

SUMMARY OF THE INVENTION

It is, therefore, an object of the present invention to provide a complex wireless service apparatus using a wired and wireless communication system and a method thereof wherein when voice and data calls for a complex wireless terminal are not reachable even though they are tried, the calls are automatically tried through another network by making a service user's position to be registered automatically using the complex wireless terminal which provides plural band/plural mode.

It is another object of the present invention to provide a complex wireless service apparatus using a wired and wireless communication system and a method thereof wherein when a service user moves between networks during making a call, voice and data services can be provided without any break by providing a handoff between the networks when a service area of the complex wireless terminal moves from one area to another area while the voice and data calls of the complex wireless terminal is under the service.

It is yet another object to provide an apparatus and technique of a complex wireless service apparatus, when on transmitting an outgoing phone number and an extension number from a mobile switching center to a wired and wireless complex gateway, the numbers are easily transmitted using an outgoing phone display function, and a usage convenience of the complex wireless terminal can be enhanced by providing a handoff for plural band and plural mode of the complex wireless terminal and then guaranteeing mobility.

It is still another object to provide an apparatus and technique of a complex wireless service apparatus, where the user can save a communication charge by automatically providing a service for the complex wireless terminal through an extension wireless network, and a demand for the complex wireless terminal can be generated by providing a handoff between networks for the complex wireless terminal and overcoming a defect of the complex wireless terminal.

It is another object to provide an apparatus and technique of a complex wireless service apparatus that is easy to implement and cost effective while being more efficient.

According to an aspect of the present invention, there is provided a complex wireless service apparatus using a wired and wireless communication system, the apparatus including: a home location register for storing a database of a mobile communication phone number for the complex wireless terminal which supports plural band/plural mode, whether an extension location is inside or outside, a public phone number, and a wireless terminal unique number; a mobile switching center for performing an extension location registration for the complex wireless terminal in the home location register in the case that the extension location registration is requested by the complex wireless terminal, and, in the case that an incoming request is made in the complex wireless terminal, trying the incoming using the public phone number of the complex wireless terminal and wireless terminal unique number when the complex wireless terminal is located in the premises with reference to the home location register and trying the incoming using the mobile communication phone number when the complex wireless terminal is located in a mobile communication service area; and a wired and wireless complex gateway for trying an incoming with the complex wireless terminal using the wireless terminal unique number transmitted from the mobile switching center through the public exchange in the case that the incoming request including the wireless terminal unique number for the complex wireless terminal is made from the mobile switching center.

Preferably, the complex wireless terminal includes a high frequency unit for supporting the plural bands and a base band unit for supporting the plural modes and supports the plural bands/plural modes among CDMA, GSM, WCDMA, wireless LAN, BLUETOOTH communication methods.

Preferably, the complex wireless terminal periodically monitors strength of a pilot signal of the other system even when a system provides a service by obtaining signals of the plural bands/plural modes from a corresponding system in an idle state to collect information and confirming whether the system is serviced, and, in the case that the complex wireless terminal moves from a mobile communication service area to an extension wireless network service area, when a pilot signal of an access point in the extension wireless network service area is sensed, registers the mobile switching center in the home location register by transmitting an access point pilot signal sensing message to the mobile switching center.

Preferably, the home location register stores whether the extension service for the complex wireless terminal is supported in the database to manage, and the mobile switching center confirms information on a location of the complex wireless terminal registered in the home location register in the case that there is an incoming request for the complex wireless terminal, and tries the incoming using a public phone number of the complex wireless terminal and a wireless terminal unique number when the complex wireless terminal is located in the premises and the extension service can be supported.

Preferably, an incoming request including the wireless terminal unique number for the wired and wireless complex gateway of the mobile switching center enables the mobile terminal unique number and outgoing number to be transmitted to the wired and wireless complex gateway using an outgoing phone display service by the mobile switching center.

According to another aspect of the present invention, there is provided a complex wireless service apparatus using a wired and wireless communication system, the apparatus including: a home location register for storing a database of a mobile communication phone number for the complex wireless terminal which supports plural band/plural mode, whether an extension location is inside or outside, a public phone number, and a wireless terminal unique number; a mobile switching center for providing, in the case that the complex wireless terminal moves to an extension wireless service area and requests location registration while making a communication with the base station transceiver subsystem through a base station controller, a communication without any disconnection by registering the extension location for the complex wireless terminal in the home location register and providing an extension wireless network using a public phone number and a unique number of the complex wireless terminal, and, providing, in the case that the complex wireless terminal moves to a mobile communication service area and requests an extension location registration cancellation while making a communication to a public exchange through an extension wireless service network, a communication without any disconnection by performing the extension location registration cancellation for the complex wireless terminal in the home location register and providing a mobile communication service to a base station transceiver subsystem for the complex wireless terminal through the base station controller; and a wired and wireless complex gateway for establishing a communication line to the complex wireless terminal using a wireless terminal unique number transmitted from the mobile switching center through the public exchange in the case that a communication line establishment request including the wireless terminal unique number for the complex wireless terminal is made from the mobile switching center.

According to yet another aspect of the present invention, there is provided a complex wireless service apparatus using a wired and wireless communication system, the apparatus including: a home location register for storing a database of a mobile communication phone number for the complex wireless terminal which supports plural band/plural mode, whether an extension location is inside or outside, a public phone number, and a wireless terminal unique number; a mobile switching center for providing, in the case that the complex wireless terminal moves to an extension wireless service area and requests location registration while making a communication to the base station transceiver subsystem using an outgoing through a base station controller, a communication without any disconnection by registering an extension location for the complex wireless terminal in the home location register and providing an extension wireless network using a public phone number and a unique number of the complex wireless terminal, and, providing, in the case that the complex wireless terminal moves to a mobile communication service area and requests an extension location registration cancellation while making a communication to the public exchange using an outgoing through an extension wireless service network, a communication without any disconnection by performing an extension location registration cancellation for the complex wireless terminal in the home location register and providing a mobile communication service to a base station transceiver subsystem for the complex wireless terminal through the base station controller; and a wired and wireless complex gateway for establishing a communication line to the complex wireless terminal using a wireless terminal unique number transmitted from the mobile switching center through the public exchange in the case that a communication line establishment request including the wireless terminal unique number for the complex wireless terminal is made from the mobile switching center.

According to yet another aspect of the present invention, there is provided a complex wireless service apparatus using a wired and wireless communication system, the apparatus including: a home location register for storing a database of a mobile communication phone number for the complex wireless terminal which supports plural band/plural mode, whether an extension location is inside or outside, a public phone number, and a wireless terminal unique number; a mobile switching center for providing, in the case that the complex wireless terminal moves to an extension wireless service area and requests location registration while making a communication to the base station transceiver subsystem using an incoming through a base station controller, a communication without any disconnection by registering the extension location for the complex wireless terminal in the home location register and providing an extension wireless network using a public phone number and a unique number of the complex wireless terminal, and, providing, in the case that the complex wireless terminal moves to a mobile communication service area and requests an extension location registration cancellation while making a communication to the public exchange using an incoming through an extension wireless service network, a communication without any disconnection by performing the extension location registration cancellation for the complex wireless terminal in the home location register and providing a mobile communication service to a base station transceiver subsystem for the complex wireless terminal through the base station controller; and a wired and wireless complex gateway for establishing a communication line to the complex wireless terminal using a wireless terminal unique number transmitted from the mobile switching center through the public exchange in the case that a communication line establishment request including the wireless terminal unique number for the complex wireless terminal is made from the mobile switching center.

According to yet another aspect of the present invention, there is provided a complex wireless service apparatus using a wired and wireless communication system, including: an access gateway which is IP-DSLAM (Internet Protocol-Digital Subscriber Line Access Multiplexer) equipment connected to a private network, provides the subscriber with an ultra high speed data service, provide the network with a data service by interconnecting to the data network, and performs a VoIP service to a complex wireless terminal by interconnecting to a VoIP (Voice over Internet Protocol) network; an IP-HLR (Internet Protocol-Home Location Register) for performing office or home location registration and state management (Busy, Idle) of the complex wireless terminal subscriber, subscriber authentication management by interconnecting to a public HLR (Home Location Register) or independently; a mobile gateway which is located in the private network, manages a plurality of APs (Access Points) in the private network, performs private network location registration of the complex wireless terminal, and performs a handoff of the complex wireless terminal between the private network and the mobile network; and a softswitch and media gateway which performs voice and data exchanges among a wired network, private wireless network and wireless data network, performs a roaming among different networks, and performs a transfer of a call received from a user to a different network.

According to yet another aspect of the present invention, there is provided a complex wireless service apparatus using a wired and wireless communication system, the apparatus including: an access point which uses a narrow band wireless protocol, is connected to a DSLAM in an office area and a private exchange in a home area through a wired and wireless complex gateway in the access point according to a wired network construction connected from a public network or private network, assigns a network connection channel by selectively transmitting information to one or more internal terminals connected to internal part of the complex wireless terminal or private network or transmitting paging information for a terminal incoming, and receiving a connection signal from the wireless complex terminal, provides a gateway function is through a PSTN connection, a LAN connection function through an arbitrary wired communication line connection and a handoff function between APs installed in the private network, and transmits or receives a call signal to or from all terminals connected to the private network; an access gateway which is IP-DSLAM equipment, provides a subscriber with an ultra high speed data service, provides a network with a data service by interconnecting to a data network, and performs a VoIP service to the complex wireless terminal by interconnecting to a VoIP network; an HLR which is a database installed in each of the private/public networks and storing information of the public or private network subscriber, has a construction capable of a perfect defect monitoring and a real time database processing, and performs registration/cancellation of information on a private or public subscriber and the complex wireless terminal and an update of all information; and a softswitch and media gateway for a) being located in the private network and managing a plurality of APs in the private network, performing private network location registration of the complex wireless terminal in the HLR, and performing a handoff of the complex wireless terminal between the private network and the mobile network, and b) performing voice and data exchanges among the wired network, private wireless network and wireless data network, performing a roaming among different networks, and performing a transfer of a call received from the user to different network.

According to yet another aspect of the present invention, there is provided a complex wireless service method of a wired and wireless communication system including a complex wireless terminal for supporting plural band/plural mode, a home location register for storing whether the complex wireless terminal is located in the premises, a mobile switching center for providing the complex wireless terminal with an automatic call forwarding and handoff, and a wired and wireless complex gateway for providing a communication through an extension wireless service network, the method including: a first step of performing location registration in the home location register when the mobile switching center receives a location registration signal from the complex wireless terminal; a second step of confirming, in the case that there is an incoming request for the complex wireless terminal, whether a location of the corresponding complex wireless terminal is registered in the mobile communication service area using the home location register by the mobile switching center; and a third step of providing a) when the location of the complex wireless terminal is registered in the mobile communication service area as a result of the confirmation, a communication through the base station controller and base station transceiver subsystem by trying an incoming to the complex wireless terminal using the mobile communication phone number, and b) when the location of the complex wireless terminal is registered in the extension wireless network service area as a result of the confirmation, the communication through a public exchange by trying the incoming to the complex wireless terminal using the public phone number and the wireless terminal unique number.

Preferably, the third step includes the sub-steps of: a fourth step of maintaining the communication when the complex wireless terminal moves to an extension wireless network service area while making a communication and requests extension location registration; and a fifth step of releasing the call and performing extension location registration in the complex wireless terminal when the call is completed.

Preferably, the third step includes the sub-steps of: performing extension location registration by the mobile switching center when the complex wireless terminal moves to an extension wireless network service area and requests the extension location registration; and releasing a communication establishment to the complex wireless terminal through the base station controller and base station transceiver subsystem and providing a communication through an extension wireless network whose location is registered by way of the public exchange by the mobile switching center after the fifth step.

Preferably, the fourth step includes the sub-steps of: performing location registration by the mobile switching center when the complex wireless terminal moves to a mobile communication service area and requests the location registration; and releasing a communication establishment to the complex wireless terminal through the public exchange and an extension wireless network and providing a communication by way of a base station controller and a base station transceiver subsystem by the mobile switching center.

According to yet another aspect of the present invention, there is provided a complex wireless service method of a wired and wireless communication system including a complex wireless terminal for supporting plural band/plural mode, a home location register for storing whether the complex wireless terminal is located in the premises, a mobile switching center for providing the complex wireless terminal with an automatic call forwarding and handoff, and a wired and wireless complex gateway for providing a communication through an extension wireless service network, the method including: a first step of recognizing a location of the complex wireless terminal when the wired and wireless complex gateway receives an incoming call which has passed through the public exchange for the complex wireless terminal; and a second step of providing a) a communication through an extension wireless network when the complex wireless terminal is located in the extension wireless network as a result of the recognition, b) a communication through another extension wireless network where the complex wireless terminal is located by way of the public exchange when the complex wireless terminal is located in the other extension wireless network service area as a result of the location recognition, and c) a communication line through the mobile switching center, the base station controller and base station transceiver subsystem when the complex wireless terminal is located in the mobile communication service area as a result of the location recognition.

According to yet another aspect of the present invention, there is provided a complex wireless service method of a wired and wireless communication system including a complex wireless terminal for supporting plural band/plural mode, a home location register for storing whether the complex wireless terminal is located in the premises, a mobile switching center for providing the complex wireless terminal with an automatic call forwarding and handoff, and a wired and wireless complex gateway for providing a communication through an extension wireless service network, the method including: a first step of establishing a call through a mobile communication subscriber in an incoming side, a mobile switching center, a base station controller and a base station transceiver subsystem when the wired and wireless complex gateway receives an incoming request for the mobile communication subscriber through the complex wireless terminal; a second step of performing, when the complex wireless terminal moves to a mobile communication service area and requests location registration to the mobile switching center, the location registration in the home location register by the mobile switching center; and a third step of providing, when the mobile switching center controls the wired and wireless complex gateway to disconnect the call and the wired and wireless complex gateway releases the call, a communication with the base station controller through the base station transceiver subsystem by the mobile switching center.

According to yet another aspect of the present invention, there is provided a complex wireless service method of a wired and wireless communication system including a complex wireless terminal for supporting plural band/plural mode, a home location register for storing whether the complex wireless terminal is located in the premises, a mobile switching center for providing the complex wireless terminal with an automatic call forwarding and handoff, and a wired and wireless complex gateway for providing a communication through an extension wireless service network, the method including: a first step of establishing a call to an incoming side when a mobile switching center receives an incoming request through an base station controller and a base station transceiver subsystem from the complex wireless terminal; a second step of performing location registration in the home location register by the mobile switching center when the complex wireless terminal moves from the mobile communication service area to the extension wireless network service area and requests the location registration to the mobile switching center; and a third step of releasing the call by the mobile switching center and providing a communication through the extension wireless network by the wired and wireless complex gateway.

According to yet another aspect of the present invention, there is provided a complex wireless service method of a wired and wireless communication system including a complex wireless terminal for supporting plural band/plural mode, a home location register for storing whether the complex wireless terminal is located in the premises, a mobile switching center for providing the complex wireless terminal with an automatic call forwarding and handoff, and a wired and wireless complex gateway for providing a communication through an extension wireless service network, the method including: a first step of performing extension location registration for the complex wireless terminal in the home location register by the mobile switching center when the complex wireless terminal moves to an extension wireless service area while making a communication through a base station transceiver subsystem and a base station controller and requests the location registration; a second step of providing a communication without any disconnection through an extension wireless network service using a public phone number and a unique number of the complex wireless terminal by the mobile switching center; a third step of performing an extension location registration cancellation for the complex wireless terminal in the home location register by the mobile switching center when the complex wireless terminal moves to the mobile communication service area while making a communication with the public exchange using the extension wireless service network and requests the extension location registration cancellation; and a fourth step of providing the complex wireless terminal with a mobile communication service through the base station transceiver subsystem and base station controller and a communication without any disconnection by the mobile switching center.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
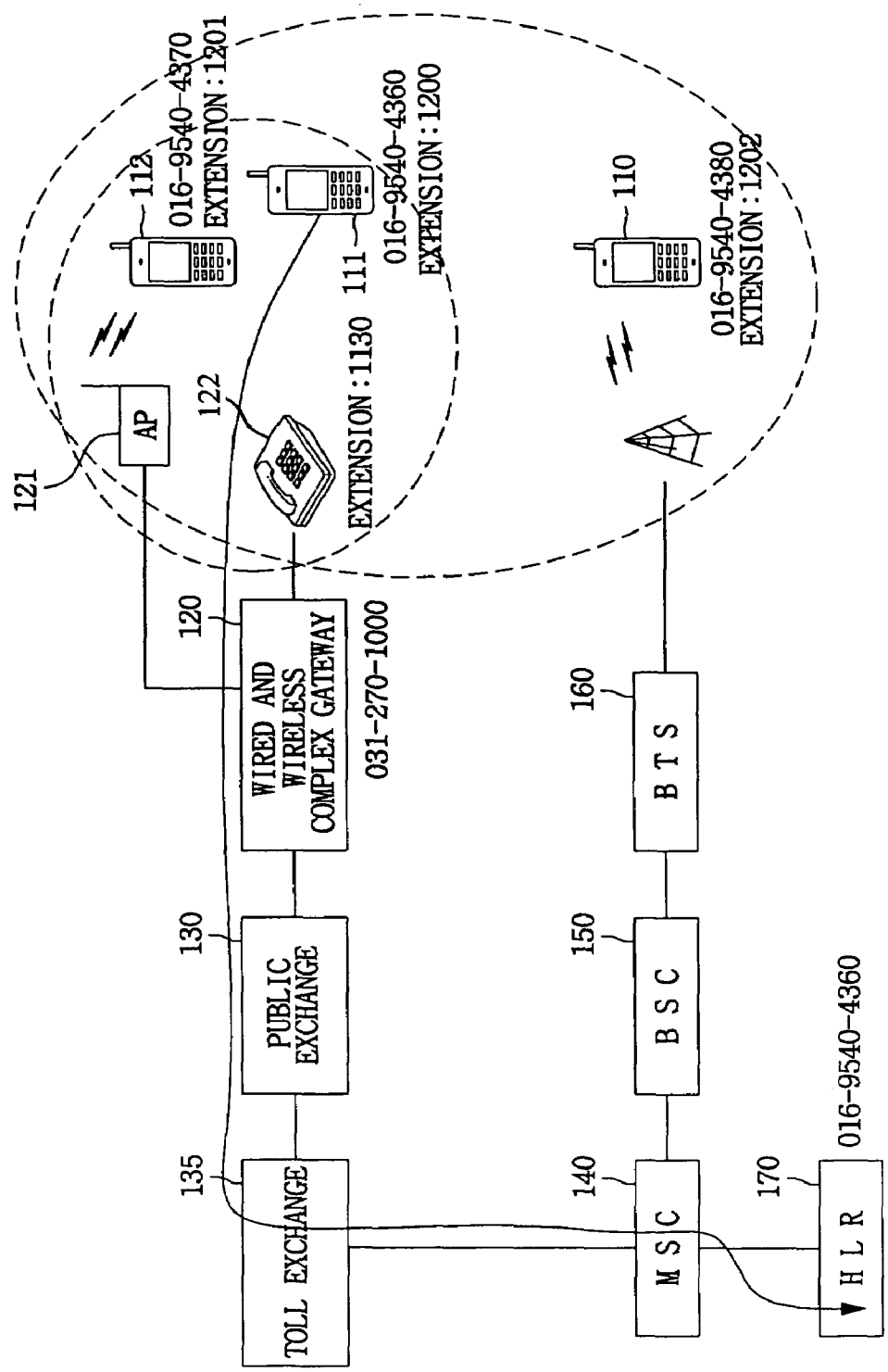
FIG. 1 is a view showing a construction of a complex wireless service apparatus using a wired and wireless communication system in accordance with an embodiment of the present invention.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout the specification.

Hereinafter, a complex wireless service apparatus using a wired and wireless communication system and a method thereof in accordance with the present invention will be in detail explained with reference to the attached drawings.

FIG. 1 is a view showing a construction of a complex wireless service apparatus using a wired and wireless communication system in accordance with an embodiment of the present invention.

Referring to FIG. 1, the complex wireless service apparatus using the wired and wireless communication system in accordance with the present invention includes a complex wireless terminal 110, 111 and 112, a wired and wireless complex gateway 120, a public exchange 130, a toll exchange 135, a mobile switching center 140, a base switching controller 150, a base station transceiver subsystem 160 and a home location register 170.

The complex wireless terminals 110, 111 and 112 are mobile terminals supporting plural bands/plural modes, which can basically process WLAN and Bluetooth as well as CDMA, GSM and WCDMA.

The complex wireless terminals 110, 111 and 112 sense all signals for plural band/plural mode, obtain and collect information from the corresponding systems (for example, CDMA, GSM, WCDMA, WLAN, BLUETOOTH, etc.), and confirm whether the corresponding systems are available for service.

When the complex wireless terminals 110, 111 and 112 are serviced by a system, they monitor the strength of a pilot signal of the other system periodically.

The complex wireless terminals 110, 111 and 112 may establish a priority or give a setting right for a system which wishes to be serviced by a user's manual operation.

When the complex wireless terminals 110, 111 and 112 are called from a mobile communication network during an extended service through an access point (AP) 121, they have a function that enables a user to select and process it or a function that sends a Busy Message as a response message.

However, in the case that the mobile switching center (MSC) 140 received a forwarding request of a mobile communication phone number of the complex wireless terminals 110, 111 and 112, the present invention provides a call forwarding in order to provide an extended wireless network service so that it is difficult to suppose the case that an incoming call is incoming from the mobile communication network during the extended service.

Also, in the case that the incoming call is incoming from the mobile communication network during the extended service, the wired and wireless complex gateway 120 may transmit the busy message instead of that the complex wireless terminals 110, 111 and 112 transmit the busy message.

Here, the extended wireless network is an exchange network for communication between telephones in the case that it is included in a subscriber such as a public office, an enterprise and a juridical person and has many phones, which is used to have a meaning of a phone switching network having an area where a general extended wireless network is serviced in connection with the present invention.

The access point 121 performs a communication in the wireless LAN or BLUETOOTH using the complex wireless terminals 110, 111 and 112 and an Air Protocol and provides connections of the complex wireless terminals 110, 111 and 112 with the extended network and public phone network through the wired and wireless complex gateway 120.

The access point 121 performs a communication by transmitting a pilot signal, a synchronization signal and a paging signal to the complex wireless terminals 110, 111 and 112, receiving an access signal from the complex wireless terminals 110, 111 and 112, and then establishing a traffic channel.

The access point 121 makes it possible to provide a speech without any disconnection even when it moves by providing a handoff between the access points.

The wired and wireless complex gateway 120 provides a connection between an extended network and a public phone network, a connection with the wired terminal 122 through a wire when a service is requested for a wired subscriber from the public phone network, and a connection with the complex wireless terminals 110, 111 and 112 through an access point when a service is requested for a wireless subscriber.

The wired and wireless complex gateway 120 provides a service through the public phone network by way of the public exchange 130 in the case that it wishes to be connected with the public phone network in the extended network.

The wired and wireless complex gateway 120 tries to receive a call through the access point 121 in the case that it receives a forwarding request for an extended number of the complex wireless terminals 110, 111 and 112. When the wired and wireless complex gateway 120 fails to receive the call, it may transmit an absent subscriber message, or try to receive the call with a mobile communication phone number of the complex wireless terminals 110, 111 and 112 using information on a location registration of the complex wireless terminals 110, 111 and 112 transmitted from the home location register 170.

The public exchange 130 is an exchange of a general public phone network, and the toll exchange 135 is an exchange which connects the public exchanges with one another.

On the other hand, the public mobile communication network is generally called a PLMN (Public Land Mobile Network), which includes an MSC (Mobile Switching Center) 140, a BSC (Base Station Controller) 150, a BTS (Base station Transceiver Subsystem) 160, and an HLR 170/VLR (Home Location Register/Visitor Location Register) of its public mobile communication system.

The mobile switching center 140 is connected with the base station controller 150, and the base station controller 150 is connected with the base station transceiver subsystem 160.

The mobile switching center 140 performs connection control of the connected base station controller 150 with another mobile switching center in a PSTN/ISDN (Public Switch Telephone Network/Integrated Services Digital Network) or a public mobile communication network.

When an incoming call request for the complex wireless terminals 110, 111 and 112 located in an extended wireless network service district is received through a mobile communication phone number, the mobile switching center 140 confirms whether an extended wireless network can be currently serviced for the complex wireless terminals 110, 111 and 112 and transfers the incoming call to the corresponding extended wireless network (when an incoming request is made to a mobile communication network phone number of 016-9540-4360 indicated in table 1 below, the incoming can be transferred to the public phone number of 031-270-1000(1200)).

Of course, in the case that the complex wireless terminals 110, 111 and 112 moves from a mobile communication network service area to the extended wireless network service area during a speech, the speech can be maintained through a mobile communication network until the speech is completed in order to guarantee the continuation of the speech and solve a difficulty of the technology embodiment.

When the mobile switching center 140 receives the incoming call during communication, it transmits a busy message to the caller to indicate that the mobile switching center is busy.

The base station controller 150 performs wireless link control and handoff functions, and the base station transceiver subsystem 160 constructs a wireless communication line together with the complex wireless terminals 110, 111 and 112 included in a communication service area, that is, a cell area and performs a function of controlling wireless resources.

In HLR/VLR, the HLR 170 performs functions of a database registering a subscriber location and storing information on the subscriber, and a VLR (not shown) is the database temporarily storing information of the complex wireless terminals 110, 111 and 112 existing in the cell area of which the mobile switching center 140 takes charge.

Representative subscriber information such as MIN (Mobile Identification Number), ESN (Electronic Serial Number), MDN (Mobile Directory Number), location information of current complex wireless terminals 110, 111 and 112, roaming information, and service shape are registered in the HLR 170 registers. Moreover, the HLR 170 stores information on whether an extended service is supported, whether there is an extended location, whether there is an extended busy and the public phone number, and wireless terminal unique number (extension number) for the complex wireless terminal service as described in an exemplary table 1.

TABLE 1

| MIN No. | Location information | Whether extension service is supported | Whether there is an extension location | Whether there is an extension busy line | Public phone number | Wireless terminal unique number |
| --- | --- | --- | --- | --- | --- | --- |
| 016-9540-4360 | MSC2, BSC3, BTS4 | Service | In | Busy | 031-270-1000 | 1200 |
| 016-9540-4370 | MSC2, BSC3, BTS4 | Service | In | Idle | 031-270-1000 | 1201 |
| 016-9540-4380 | MSC2, BSC3, BTS4 | Service | out | Idle | 031-270-1000 | 1202 |

Referring to Table 1, it is noted that the complex wireless terminal 111 whose MIN number is 016-9540-4360 is located in an extension wireless service area to which an extension service is supported, its public phone number is 031-270-1000, its wireless terminal unique number is 1200, and it is not possible to make a communication with the complex wireless terminal 111 since it is busy.

It is noted that the complex wireless terminal 112 whose MIN number is 016-9540-4370 is located in a service area to which an extension service is supported, its public phone number is 031-270-1000, its wireless terminal unique number is 1201, and it is not possible to make a communication with the terminal since it is in a state of idle.

Here, whether the extension service is supported indicates whether there is an extension service request for the complex wireless terminals 110, 111 and 112, and the service is provided only when it is possible to make the extension service (that is, the service can be provided only when the subscriber makes a request in the case of pay service).

Hereinafter, an operation of the complex wireless service apparatus using the wired and wireless communication system in accordance with the present invention constructed as described above will be explained in detail.

When the complex wireless terminals 110, 111 and 112 are located in a service area of the mobile communication, they register their locations in the home location register 170 using the mobile communication networks 140, 150 and 160.

When the complex wireless terminals 110, 111 and 112 move to an extension wireless network service area through an access point 121 in the state of idle, the complex wireless terminals 110, 111 and 112 sense a pilot signal of the access point 121 while monitoring with the plural band/plural mode.

The complex wireless terminals 110, 111 and 112 inform the mobile switching center 140 of an access point sensing message indicating that the pilot signal of the access point 121 was sensed through the base station transceiver subsystem 160 and the base station controller 150.

Then, the mobile switching center 140 determines whether an access point is the access point 121 with which an extension wireless network service for the complex wireless terminals 110, 111 and 112 is provided with reference to registration information on the home location register 170, and performs an extension location registration when the access point is the access point 121 with which an extension wireless network service for the complex wireless terminals 110, 111 and 112 is provided. That is, the mobile switching center 140 records on the home location register 170 that an extension wireless network service can be provided through the access point 121 using the extension network.

When the complex wireless terminals 110, 111 and 112 move from an extension wireless network service area to a mobile communication network service area, the complex wireless terminals 110, 111 and 112 sense a pilot signal of the mobile communication network and inform the mobile switching center 140 of their movement through the base station transceiver subsystem 160 and the base station controller 150.

Then, the mobile switching center 140 records on the home location register 170 that it is possible to provide services through the base station controller 150 and the base station transceiver subsystem 160.

On the other hand, the wired and wireless complex gateway 120 provides a communication through the public exchange 130 and the toll exchange 135 when the complex wireless terminals 110, 111 and 112 located in the extension wireless network service area receive an outgoing call for other public phone network subscribers.

At this time, in the case that a user of the complex wireless terminals 110, 111 and 112 moves from the extension wireless network service area to the mobile communication network service area, the communication is stopped.

Of course, in the case that the user of the complex wireless terminals 110, 111 and 112 moves from the extension wireless network service area to the mobile communication network service area, the wired and wireless complex gateway 120 receives the location information for the complex wireless terminals 110, 111 and 112 from the mobile switching center 140, and converts the service into other extension wireless networks where the complex wireless terminals 110, 111 and 112 are located or into the mobile communication network where the complex wireless terminals 110, 111 and 112 are located.

In the case that the complex wireless terminals 110, 111 and 112 located in the extension wireless network service area receive the outgoing call for other mobile communication network service subscribers, the wired and wireless complex gateway 120 provides a communication through the public exchange 130, the toll exchange 135 and the mobile switching center 140.

At this time, in the case that the user of the complex wireless terminals 110, 111 and 112 moves from the extension wireless network service area to the mobile communication network service area, the mobile switching center 140 provides a communication without any interference when it is sensed that the complex wireless terminals 110, 111 and 112 moved from the extension wireless network service area to the mobile communication network service area.

That is, when the mobile switching center 140 is interconnected to a public phone for the complex wireless terminals 110, 111 and 112 and senses that the user of the complex wireless terminals 110, 111 and 112 moved to the mobile communication service area, it is sensed using a mobile communication network pilot sensing message received from the complex wireless terminal, while providing a communication service, a communication line to the complex wireless terminals 110, 111 and 112 is established at once through the base station controller 150 and the base station transceiver subsystem 160 and a communication without any interference can be provided.

On the other hand, when the mobile switching center 140 is interconnected to a public phone network/mobile communication network for the complex wireless terminals 110, 111 and 112, and senses that the user of the complex wireless terminals 110, 111 and 112 moved from the mobile communication service area to the extension wireless network service area, it is sensed using an extension wireless network pilot sensing message received from the complex wireless terminal, and a communication without any interference can be provided at once through the public exchange 130 and wire and wireless complex gateway 120.

Of course, when the complex wireless terminals 110, 111 and 112 are moved from the mobile communication network service area to the extension wireless network service area, the communication may be maintained in order to guarantee a continuation of the communication and to solve a difficulty of embodying the technology through the mobile communication network until the communication is completed.

In the case that the incoming request is made through the mobile communication phone number for the complex wireless terminals 110, 111 and 112, when it is sensed that the complex wireless terminals 110, 111 and 112 are currently located in the extension wireless network service area through the access point 121, the mobile switching center 140 informs the wired and wireless complex gateway 120 of the phone number of the caller and the extension number of the incoming complex wireless terminals 110, 111 and 112, and makes the wired and wireless complex gateway 120 to try the incoming. Of course, in the case that the complex wireless terminals 110, 111 and 112 are busy at this time, the mobile switching center 140 informs the incoming side of a busy message to indicate that the complex wireless terminals 110, 111 and 112 are busy.

The mobile switching center 140 informs the message through a caller phone number indication service using a method that the mobile switching center 140 informs the wired and wireless complex gateway 120 of the caller number and the extension number. The mobile switching center 140 may use "wireless terminal unique number*outgoing number" of "1200*011-333-3333", for example.

When the wired and wireless complex gateway 120 extracts the number placed before the "*", the wireless complex gateway 120 identifies the number as the wireless terminal unique number (extension number) and tries to receive the number as the wireless terminal unique number (extension number). In addition, when the wired and wireless complex gateway 120 extracts the number placed after the "*", the wired and wireless complex gateway 120 tries to receive the call and makes it possible to communicate with the corresponding caller.

In the case that there is an incoming from an outside source, and the outgoing side is a public phone network and it is an incoming request for the complex wireless terminals 110, 111 and 112 using the extension wireless network, a service for the complex wireless terminals 110, 111 and 112 is provided through the public exchange 130 and the wired and wireless complex gateway 120.

At this time, in the case that the complex wireless terminals 110, 111 and 112 are not located in an area where the extension wireless network service is not available, the wired and wireless complex gateway 120 stores information on the location of the complex wireless terminals 110, 111 and 112 and then provides the extension wireless network service/mobile communication network service according to the corresponding location.

Figure 2:
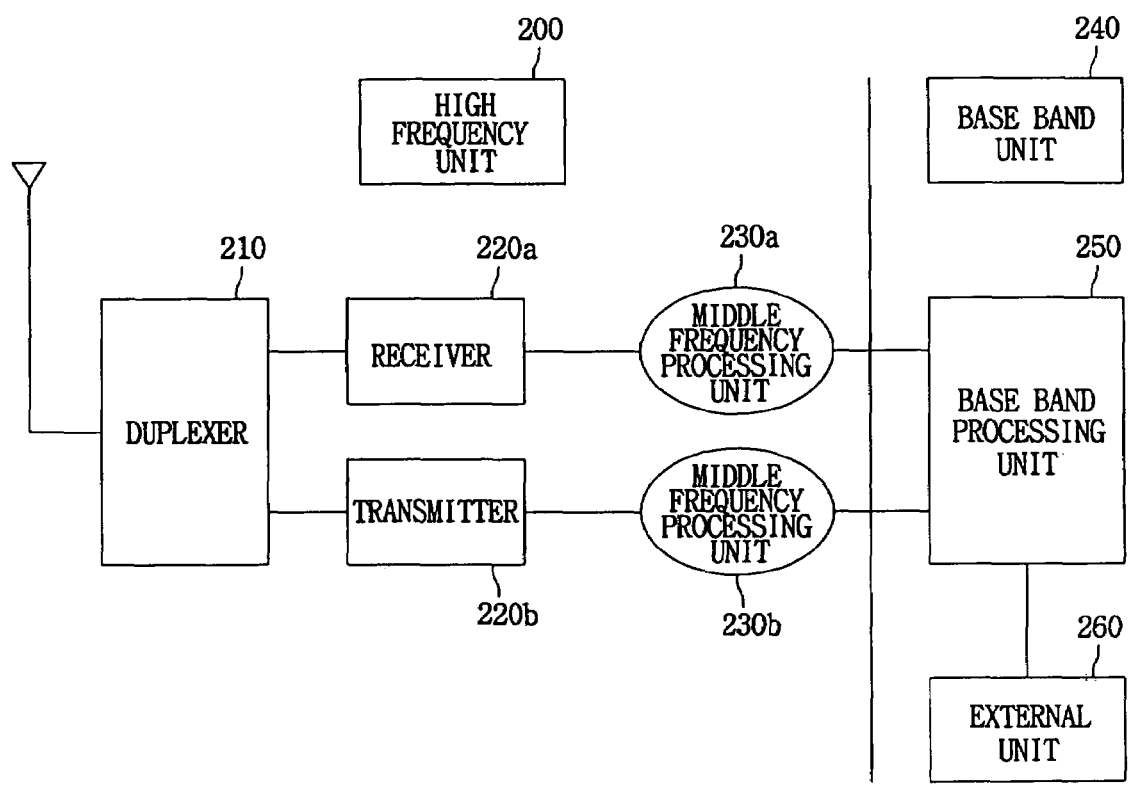
FIG. 2 is a view showing a construction of the complex wireless terminal of FIG. 1.
Figure 3:
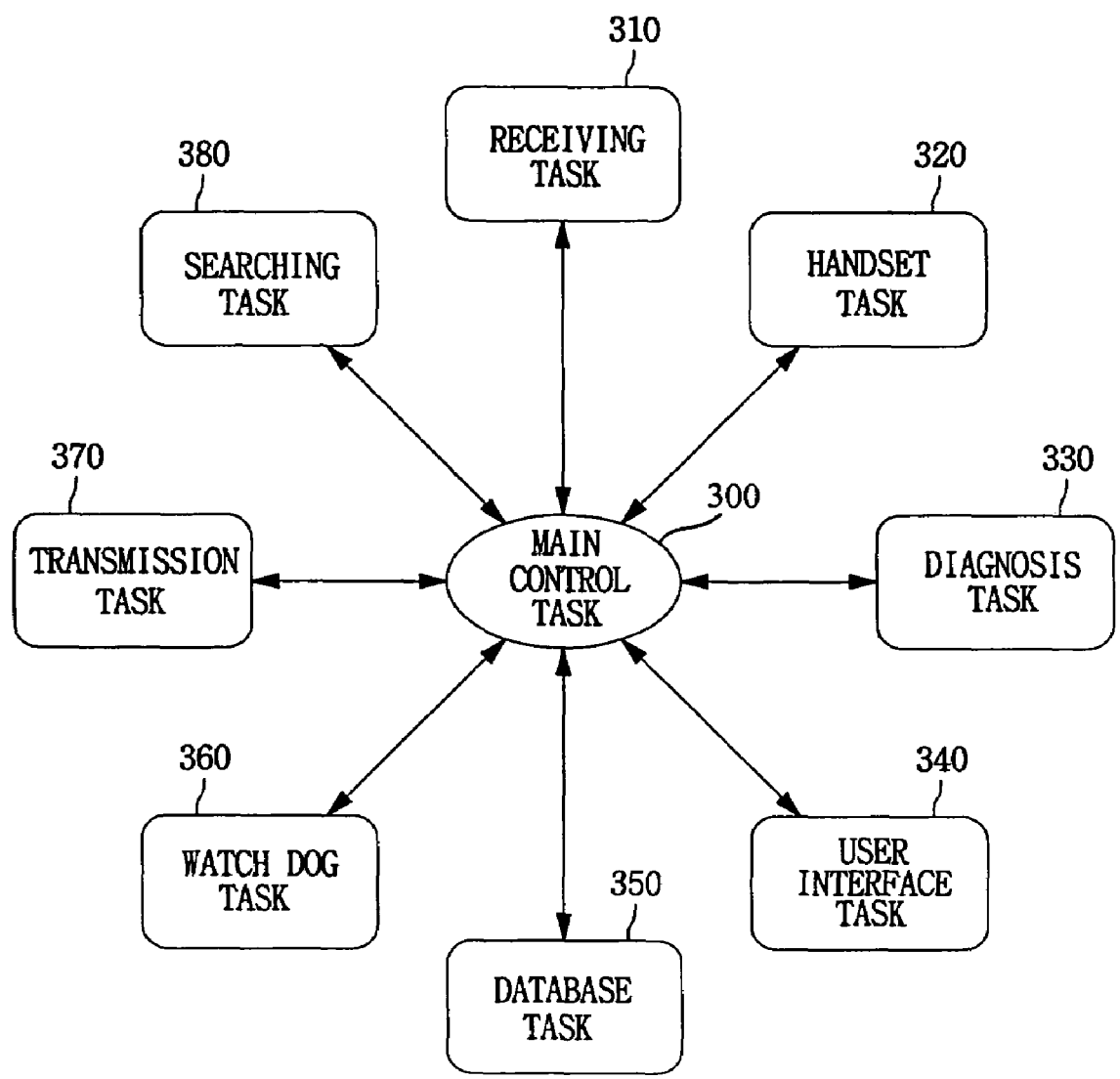
FIG. 3 is a view showing a task construction of the complex wireless terminal of FIG. 1.

FIG. 2 is a view showing a construction of the complex wireless terminal of FIG. 1, and FIG. 3 is a view showing a task construction of the complex wireless terminal of FIG. 1.

As shown in FIG. 2, the complex wireless terminal is consisted of a high frequency unit 200 and a base band unit 240, the high frequency unit including a duplexer 210, a receiver 220*a*, a transmitter 220*b*, a middle frequency processing unit of receiving side 230*a* and a middle frequency processing unit of transmitting side 230*b*, and the base band unit 240 including a base band processing unit 250 and an external unit 260 such as a memory.

Also, as shown in FIG. 3, a task of a complex wireless terminal includes a main control task 300 performing a process task generation, a process task control, all task managing for removing the process task, and a call process, a receiving task 310 for processing a receiving related message including an analysis of the receiving message, a handset task 320 for managing input and output of a complex wireless terminal such as a keyboard input, a diagnosis task 330 for controlling the complex wireless terminal and loading data using an external communication, a user interface task 340 for displaying a usage state of the complex wireless terminal to a user, a database task 350, a watch dog task 360 for monitoring a software, a transmission task 370, and a searching task 380 for obtaining a pilot signal and a system such as a timing change.

The complex wireless terminal is a terminal for supporting the plural band/plural mode, which can process a wireless LAN and a BLUETOOTH as well as CDMA, GSM, WCDMA basically.

If a filter is added to the receiving unit 220*a* of the complex wireless terminal, it is possible to receive the plural bands, and the plural mode can be embodied through the base band processing unit 250.

The searching task 380 of the complex wireless terminal obtains all signal of the plural band/plural mode from the corresponding system in the idle state, collects information and confirms whether the system can be serviced or not. Also, even in the case that a system is serviced, the strength of pilot signal of the other system is periodically monitored.

In the case that the searching task 380 moves from the mobile communication service area to the extension wireless network service area, when a pilot signal of the access point in the extension wireless network service area is sensed, an access point pilot signal sensing message is transmitted to the mobile switching center and registered and managed in the home location register.

Figure 4:
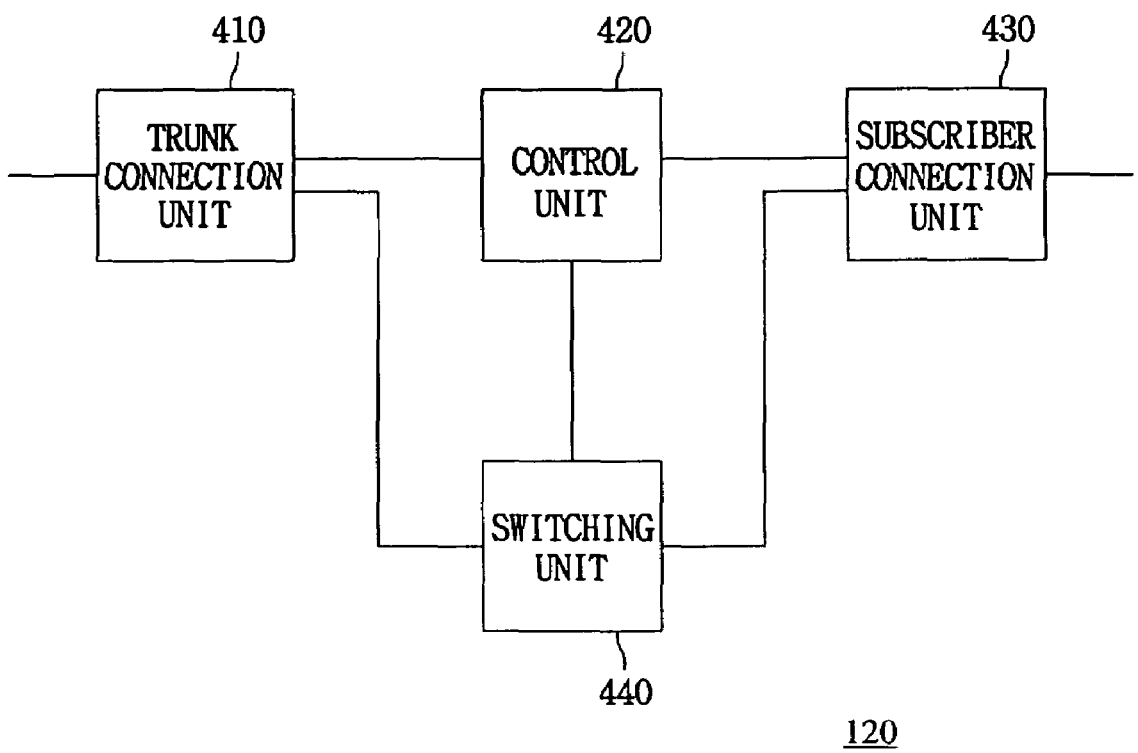
FIG. 4 is a view showing a construction of the wired and wireless complex gateway shown in FIG. 1.

FIG. 4 is a view showing a construction of the wired and wireless complex gateway shown in FIG. 1.

As shown in FIG. 4, the wired and wireless complex gateway 120 includes a trunk connection unit 410, a control unit 420, a subscriber connection unit 430, and a switching unit 440.

The control unit 420 controls a system and manages a subscriber and a database, which analyzes signals received from the subscriber connection unit 430 and the trunk connection unit 410 and then requests a connection to the switching unit 440.

When the control unit 420 receives a service request for a wireless subscriber from the exchange through the trunk connection unit 410, the control unit 420 controls the switching unit 440 and the subscriber connection unit 430 and then establishes a communication line to the complex wireless terminal. Moreover, when the control unit 420 receives a service request for a wired subscriber, it establishes the communication line to the wired subscriber through the switching unit 440 and the subscriber connection unit 430.

The control unit 420 disconnects the communication line when the complex wireless terminal moves to the mobile communication network service area while performing the communication.

In the case that the control unit 420 fails to receive a call when it tries an incoming in order to provide an extension wireless network service for the complex wireless terminal, it receives information on a location of the complex wireless terminal from the mobile switching center and converts the incoming to an extension network in which the complex wireless terminal is currently located or the mobile communication network.

The switching unit 440 performs a function of transmitting subscriber traffic data transmitted to or received from the subscriber connection unit 430 and the trunk connection unit 410 to the corresponding port according to the control of the control unit 420.

The subscriber connection unit 430 takes charge of a service for the wired or wireless subscriber, and establishes a call to the wired terminal in the case of wired subscriber and to the wireless terminal in the case of the wireless subscriber according to control of the control unit 420.

The trunk connection unit 410 is interconnected to the public exchange and performs a function of connecting a call from an internal part to an external part.

Figure 5:
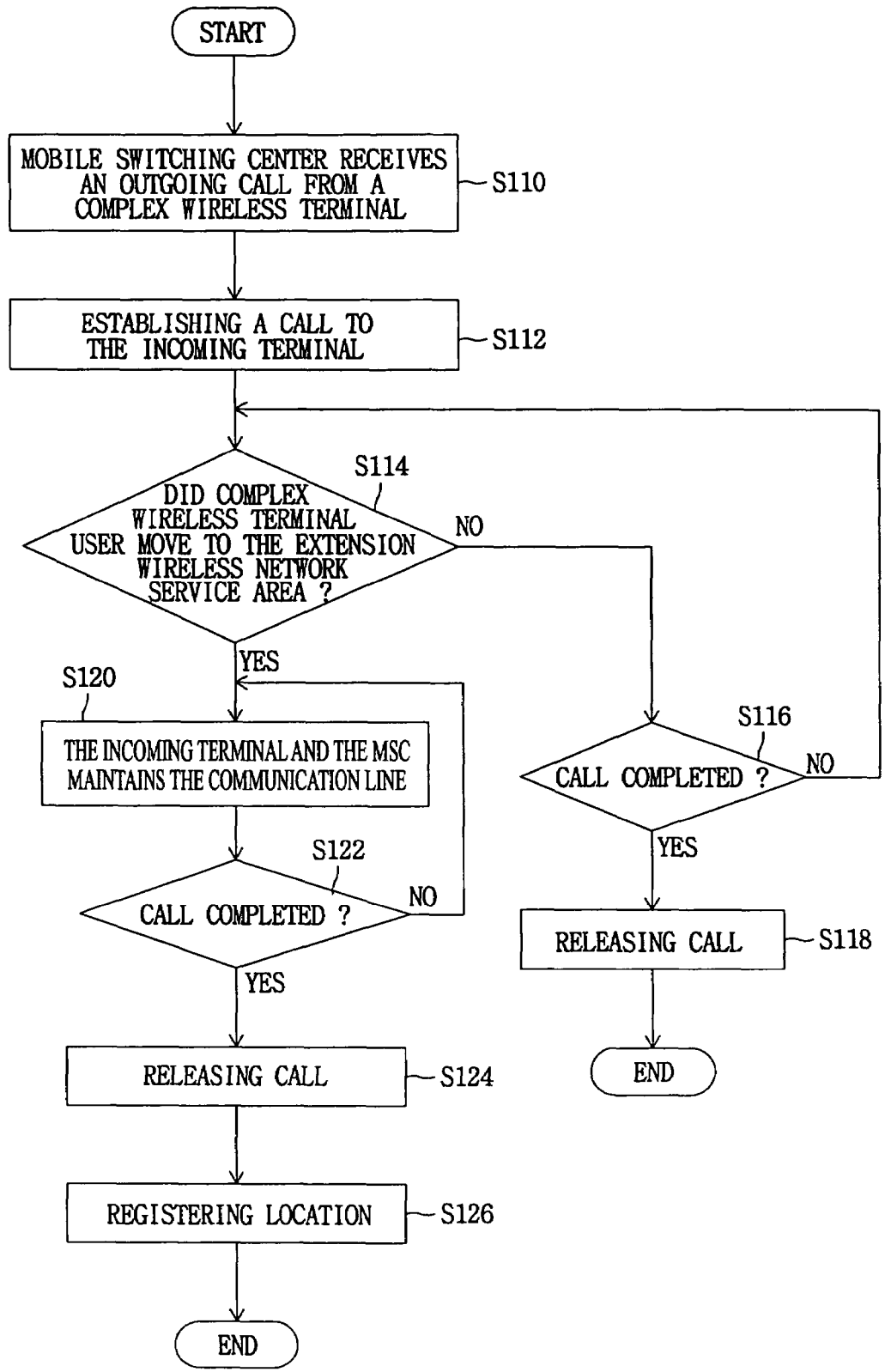
FIG. 5 is a flow chart showing a process of outgoing call of a complex wireless terminal placed in a mobile communication service area in accordance with an embodiment of the present invention.

FIG. 5 is a flow chart showing a process of an outgoing call of a complex wireless terminal placed in a mobile communication service area in accordance with an embodiment of the present invention.

As shown in FIG. 5, the mobile switching center receives the outgoing call from the complex wireless terminal (step S110), it transmits a call setup message to an incoming side, and establishes a communication line when a call response message is received from the incoming side after transmitting the call setup message (step S112).

Next, after monitoring whether the complex wireless terminal moves to the extension wireless network service area (step S114), when it does not move to the extension wireless network service network, the call is released as the call is completed (steps S116 and S118). When the call is not completed (step S116), then there is monitoring of whether the complex wireless terminal moves to the extension wireless network service area (step S114) again.

However, when the complex wireless terminal moves to the extension wireless network service area, the mobile switching center and the incoming terminal maintain the communication line (step S120), and when the call is completed (step S122), the call is released (step S124) and then the location of the complex wireless terminal is registered in the home location register (step S126). If the call is not completed (step S122), then the mobile switching center and the incoming terminal maintain the communication line again (step S120).

Here, even though the complex wireless terminal maintains the communication line when it moves to the extension wireless network service area, the incoming may be converted to provide the service through the extension wireless network by permitting the location registration, otherwise.

Figure 6:
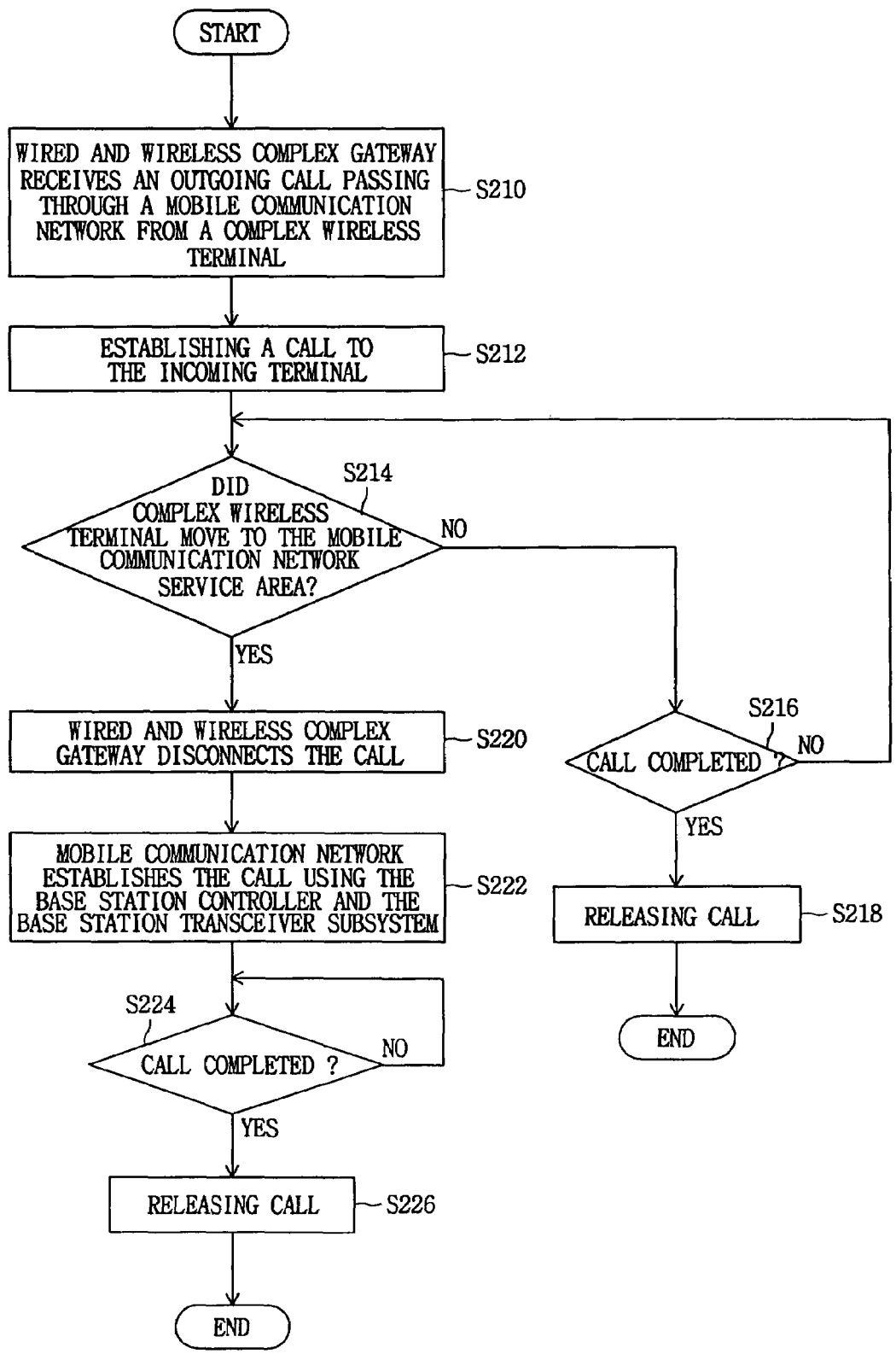
FIG. 6 is a flow chart showing a process of an outgoing call of a complex wireless terminal located in an extension service area in accordance with an embodiment of the present invention.

FIG. 6 is a flow chart showing a process of an outgoing call of a complex wireless terminal located in an extension service area in accordance with another embodiment of the present invention.

As shown in FIG. 6, when a wired and wireless complex gateway receives the outgoing call passing through a mobile communication network from the complex wireless terminal (that is, when the phone in the incoming side is a mobile communication terminal) (step S210), it establishes a call to the incoming terminal by way of the mobile switching center (step S212).

Next, after determining whether the complex wireless terminal moved to the mobile communication network service area (step S214), when the complex wireless terminal did not move to the mobile communication network service area, the call is release as it is completed (steps S216 and S218). If the call is not completed (step S216), then there is a determining of whether the complex wireless terminal moved to the mobile communication network service area (step S214).

However, in the case that the complex wireless terminal moved to the mobile communication network service area, the mobile switching center performs a location registration for the complex wireless terminal and then the wired and wireless complex gateway disconnects the call (step S220), and the mobile communication network establishes the call using the base station controller and the base station transceiver subsystem (step S222). Next, until the call is completed, the call is released (steps S224 and S226).

Here, even though a case that the incoming side is a subscriber of the mobile communication network has been explained, a case that the incoming side is a public phone network subscriber can be embodied in the same manner.

Figure 7:
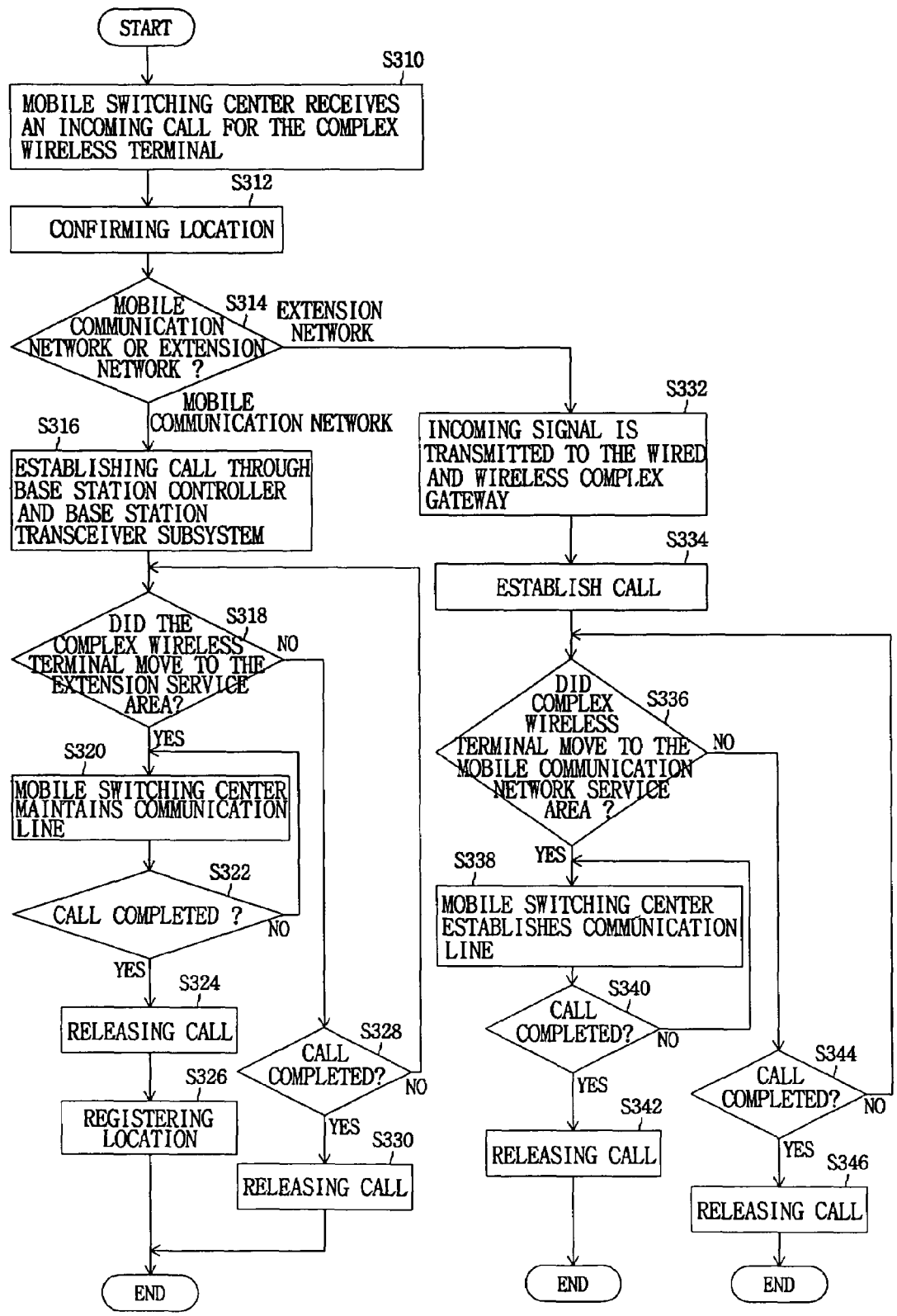
FIG. 7 is a flow chart showing a process of an incoming call for a complex wireless terminal passing through a mobile communication network in accordance with another embodiment of the present invention.

FIG. 7 is a flow chart showing a process of an incoming call for a complex wireless terminal passing through a mobile communication network in accordance with another embodiment of the present invention.

As shown in FIG. 7, in the case that the mobile switching center receives the incoming call for the complex wireless terminal (step S310), the mobile switching center confirms a location (step S312), and provides a mobile communication service (step S314) through the base switching center and the base station transceiver subsystem when the mobile switching center is located in the mobile communication network service area (step S316). At this time, when the complex wireless terminal is busy, the mobile switching center transmits a busy message to the incoming side and informs the incoming side that the complex wireless terminal is busy.

Next, after monitoring whether the complex wireless terminal moves to the extension wireless network service area (step S318), the call is released when the call is completed in the state that the complex wireless terminal did not move to the area (steps S328 and S330). If the call is not completed (step S328), then there is still a monitoring of whether the complex wireless terminal moves to the extension wireless network service area (step S318).

In addition, in the case that the complex wireless terminal moves to the extension wireless network service area, the mobile switching center also maintains the call passing through the mobile communication network in this case (step S320), and when the call is completed (step S322), the call is released (step S324) and the location is registered (step S326). The mobile switching center maintains the communication line (S320) until the call is completed (S322).

On the other hand, in the case that the complex wireless terminal is located in the extension wireless network service area (step S314) as a result of confirming the location (step S312) after receiving the incoming signal (step S310), extension and incoming numbers are transmitted to the wired and wireless complex gateway using an outgoing phone number service (step S332), and the wired and wireless complex gateway establishes the call (step S334). At this time, when the complex wireless terminal is busy, the mobile switching center transmits the busy message to the incoming side and informs the incoming side that the complex wireless terminal is busy.

Next, after determining whether the complex wireless terminal moved to the mobile communication network service area, when the complex wireless terminal moved to the mobile communication network service area (step S336), the mobile switching center establishes the call by making the location registration being permitted (step S338), and the call is released when and until the call is completed (step S342).

In the case that the complex wireless terminal is located in the extension wireless network service area (step S336), the call is released when the call is completed (steps S344 and S346). Otherwise, if the call is not completed (step S344), there is still a determination of whether a complex wireless terminal is moved to the mobile communication network service area or is still located in the extension wireless network service area (step S336).

Figure 8:
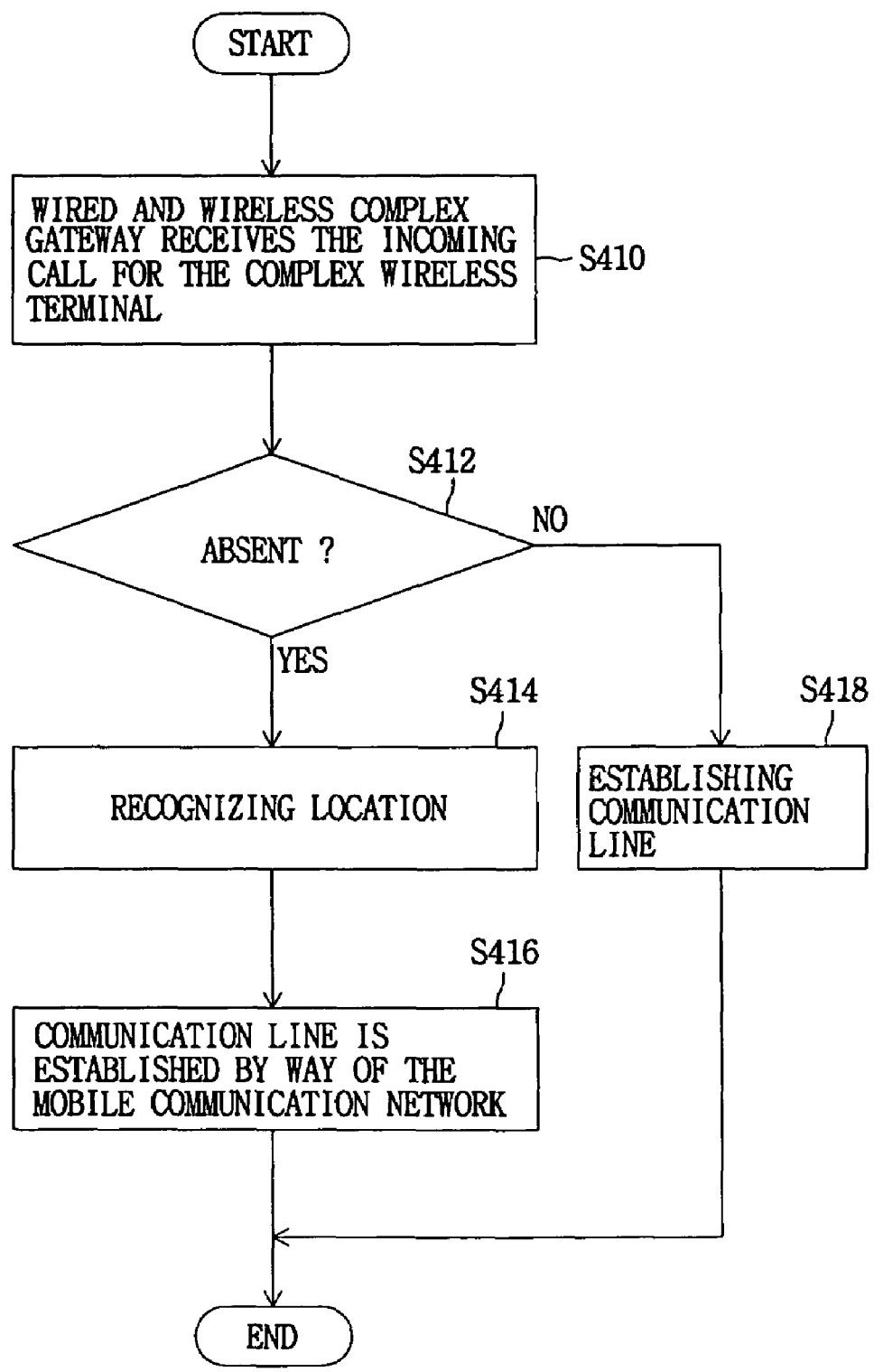
FIG. 8 is a flow chart showing a process of an incoming call for a complex wireless terminal passing through an extension wireless network in accordance with another embodiment of the present invention.

FIG. 8 is a flow chart showing a process of an incoming call for a complex wireless terminal passing through an extension wireless network in accordance with another embodiment of the present invention.

As shown in FIG. 8, when the wired and wireless complex gateway receives the incoming call passing through a public exchange for the complex wireless terminal (step S410), the wired and wireless complex gateway tries to accommodate or accept the call for the complex wireless terminal and determines whether the complex wireless terminal is absent (step S412).

As a result of the determination, when the complex wireless terminal is absent, the wired and wireless complex gateway checks out information on a location of the complex wireless terminal received from the mobile switching center, or received in real time (step S414). Additionally, when the complex wireless terminal is located in the mobile communication network service area as a result of the checking, a communication line is established by way of the mobile switching center, the base station controller and the base station transceiver subsystem (step S416).

As a result of the determination (step S412), when the complex wireless terminal is not absent, a communication line to the complex wireless terminal is established using the wired and wireless complex gateway (step S418).

Here, while a load of the wired and wireless complex gateway is embodied to be reduced by making the complex wireless terminal to be found out in its absence, it may be embodied that the location is found out firstly and the wireless service is provided according to the found location when the incoming trial is made for the complex wireless terminal.

On the other hand, while the embodiment of the present invention is explained centering around a network of the CDMA mobile communication network, the present invention can be applied to GSM and WCDMA in the same manner.

Also, while it is embodied that information on the location of the complex wireless terminal stored in the home location register of the mobile switching center is shared with the wired and wireless complex gateway, it may be embodied that only the home location register of the mobile switching center manages information on the location of the complex wireless terminal and accordingly only the mobile switching center performs a call forwarding service.

While the embodiment explains a voice call service in the complex wireless service, a data service will be briefly explained with reference to FIG. 9, hereinafter.

Figure 9:
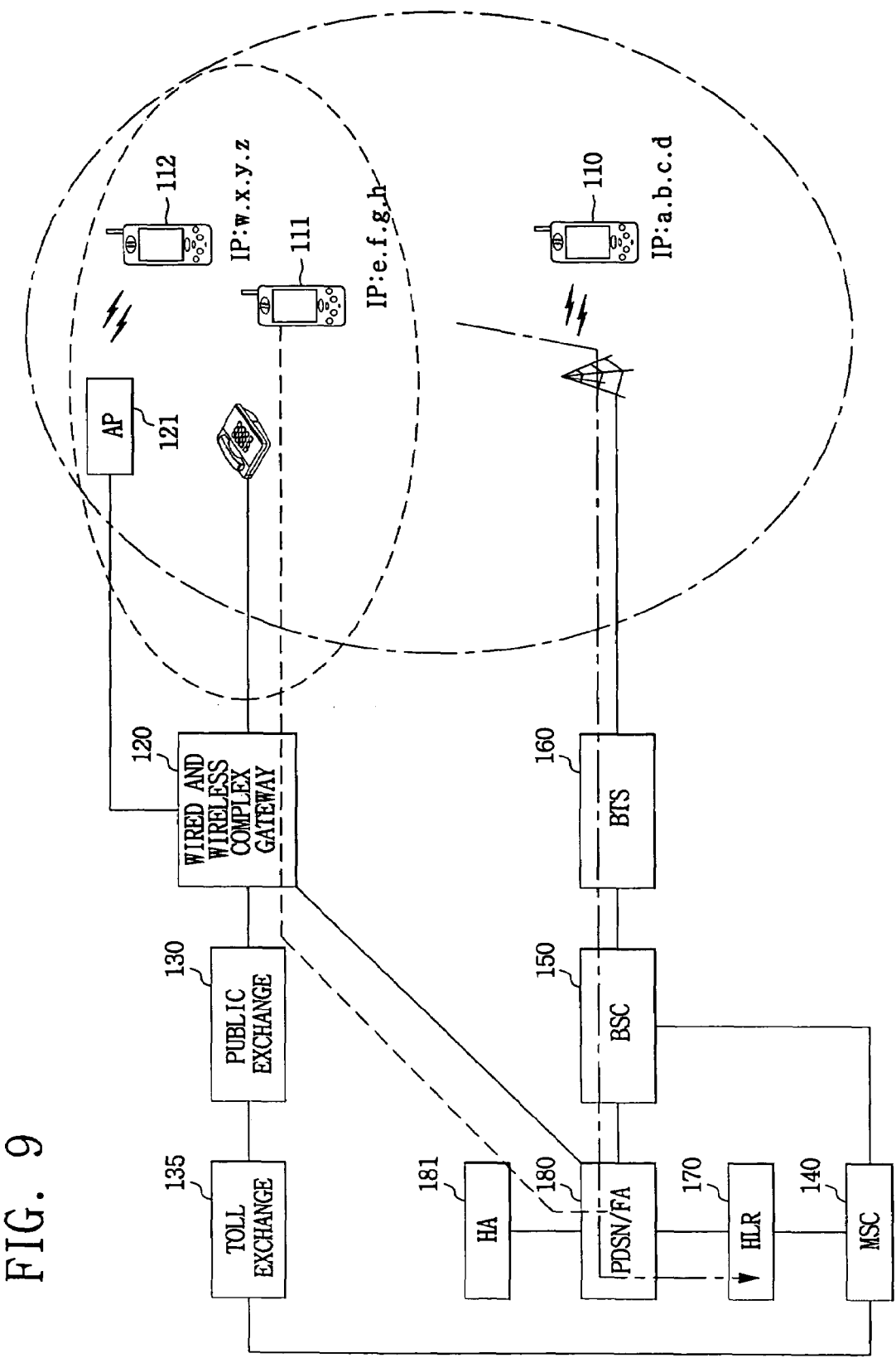
FIG. 9 is a view showing a construction of a complex wireless service apparatus capable of performing a data communication in a wired and wireless communication system in accordance with another embodiment of the present invention.

FIG. 9 is a view showing a construction of a complex wireless service apparatus capable of performing a data communication in a wired and wireless communication system in accordance with another embodiment of the present invention, wherein explanations for the same constituents overlapped with the system shown in FIG. 1 will be omitted.

As shown in FIG. 9, the complex wireless service apparatus for the data service is constructed by adding PDSN/FA (Packet Data Serving Node/Foreign Agent) 180 and HA (Home Agent) 181 to the apparatus shown in FIG. 1.

Here, the PDSN/FA 180 is interconnected to a BSC 150 and a wired and wireless complex gateway 120, assigns a mobile IP (Mobile IP (Internet Protocol)) for a data service to the complex wireless terminals 110, 111 and 112, and establishes a PPP (Point to Point Protocol) according to the mobile IP assignment so that it can be possible to make a data communication with an IP (Internet Protocol) network. That is, in the case that the complex wireless terminals 110, 111 and 112 are assigned a mobile IP and a data service is requested from the complex wireless terminals 110, 111 and 112, the request signal is provided to the complex wired and wireless gateway 120 through the AP 121.

Since the wired and wireless complex gateway 120 transmits the data request signal requested through the AP 121 to the PDSN/FA 180 and can be connected to the Internet through the PDSN 180, it is possible to provide a data service wished (chosen) by a user.

Also, the HA 181 manages a plurality of FAs, and maintains the mobile IP to make it possible that the data service is serviced without any communication disconnection even in the moved service area when the complex wireless terminals 110, 111 and 112 move to other service areas.

Since the information on the location of the terminal is managed in the HLR 170 even in the case of the data service of the complex wireless terminals 110, 111 and 112 according to the construction as described above, the location registration is performed in the same manner as the location registration process of the complex wireless terminals 110, 111 and 112 as described above.

Also, when a data service is requested in the complex wireless terminals 110, 111 and 112 in the premises, both an Internet connection through an extension Intranet and a connection through a public network PDSN 180 are possible. The PDSN is interconnected to the wired and wireless complex gateway 120 as well as the BSC 150.

In the case of a data service incoming in the complex wireless terminals 110, 111 and 112, the incoming request of current location of the corresponding terminal is made to the corresponding BTS 160 or the wired and wireless complex gateway 120 obtained through the HLR 170 and VLR by managing a mobile IP assigned in the HA/FA 181 and 180. That is, in the case that the corresponding terminal is currently located in the premises, the incoming request signal is requested to the wired and wireless complex gateway 120, and in the case that the corresponding terminal is located in the public network, the incoming request signal is provided to the BTS 160.

Also, in the case of the data service, when the complex wireless terminal is handed-off, mobility of the terminal to which a mobile IP is assigned is guaranteed and the terminal is serviced through the same PDSN. In the case of the terminal to which the data service is provided through the Intranet, when it moves out of the premises, it cannot be provided with the extension data service.

In the course of receiving the data service in the premises, when the wireless terminal is out of the service area of the extension network, the HLR 170 and VLR change the location registration of the corresponding terminal, and the FA/HA is assigned another mobile IP of the corresponding terminal.

Accordingly, the HA 181 can provide the data service to the corresponding wireless terminal without any data service interference using a tunneling method, that is, by tunneling the data received through the mobile IP registered in the first extension network to a mobile IP newly registered through a location movement to the public network.

On the other hand, the functions of IP assignment and data hand of fusing the mobile IP are performed as follows.

All mobile agents regularly broadcast an Agent Advertisement message being an enlarged Router Advertisement message in order to make their mobile supports known. The mobile node receiving such a message can determine whether it is located in the home network or moved to a new external network using information in the message.

Representative methods to determine the movement of the mobile node include LCS (Lazy Cell Switching) and ECS (Eager Cell Switching).

In the case of the LCS, when it does not receive an agent advertisement message for the network where the LCS is currently located, the LCS determines that it is out of the current network and a registration process for a new location is performed. On the other hand, in the case of the ECS, when it receives an agent advertisement message from an external agent in a new network not being the current network even at once, it is determined as the ECS has moved to a new network. Accordingly, the ECS has a merit that its delay of movement determination is shorter than that of the LCS, whereas it has a defect that its accuracy of mobile determination is not guaranteed and an effect caused by a mobile pattern of the node is more than that of the LCS.

When it is recognized that the mobile node moved to the external network, it is possible to obtain a new COA, the COA being an IP address of the external agent obtained from the agent advertisement message (FA COA: Foreign Agent Care-of Address) or a temporary IP address obtained through the DHCP (Dynamic Host Configuration Protocol) (CCOA: Colocated Care-of Address). In the case of the CCOA, since an end point of the tunnel becomes a mobile node, an external header is additionally transmitted through the wireless channel so that the packet overhead becomes larger than the FA COA. Therefore, it is more effective to use the FA COA than the CCOA in the wireless environment.

Figure 10:
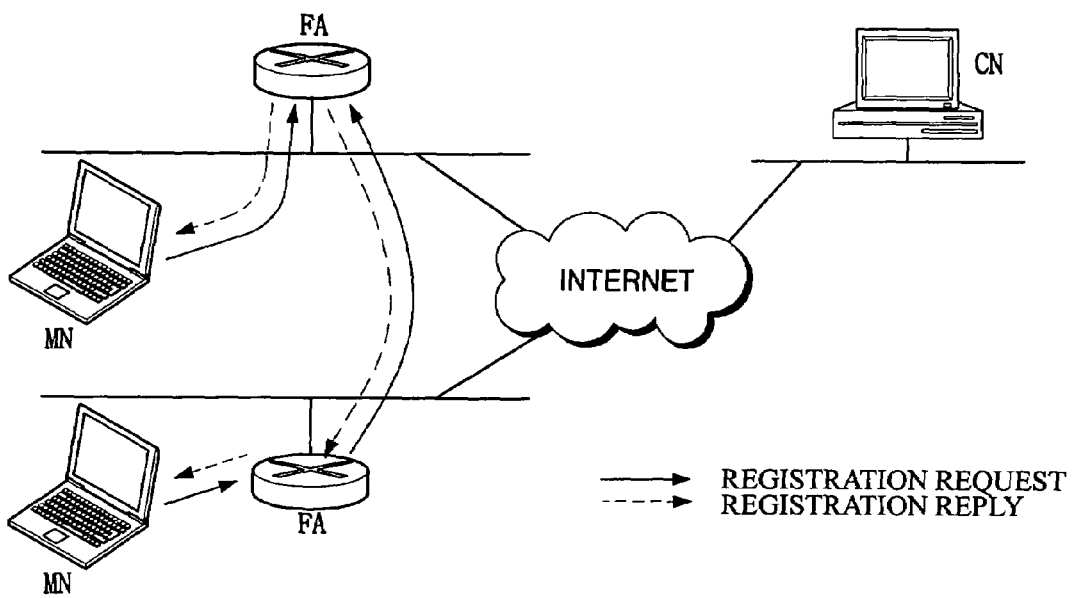
FIG. 10 is a view showing a process of registration between a mobile node that has moved to an external network and HA.

FIG. 10 is a view showing a process of registration between a mobile node that has moved to an external network and HA.

As shown in FIG. 10, the mobile node transmits a registration request message to the HA in order to establish the home address and a mobile binding of the COA and receives a registration reply message in response to the transmission. Such a registration message includes a home address of the mobile node, COA, a life time and information used to authenticate between the HA and the mobile node mutually.

Binding Information of the mobile nodes managed by the HA should be periodically updated by the mobile nodes within the registration maintaining period and its mobility should be maintained.

After the registration to the HA has been completed, the packets directed to the mobile node are tunneled to the COA by the HA which performs the proxy ARP in the home network. The packet sent by the mobile node is transmitted to the other party's node through normal IP routing and does not have to pass through the FA necessarily.

Figure 11:
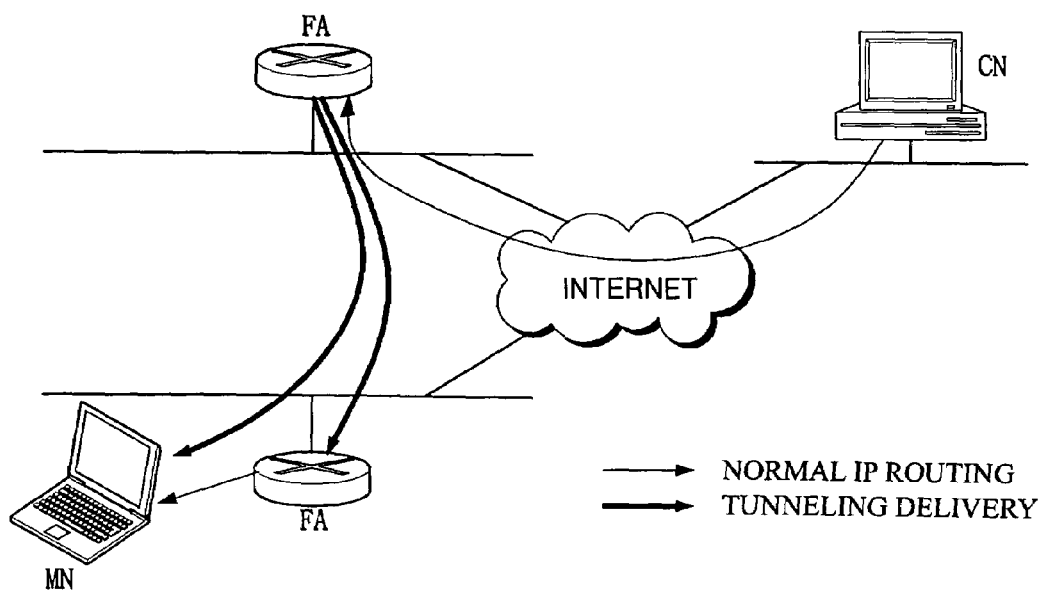
FIG. 11 is a view showing a process of a packet transmission to a mobile node located in an external network from the other party's node.

FIG. 11 is a view showing a process of packet transmission to a mobile node located in an external network from the other party's node.

Figure 12:
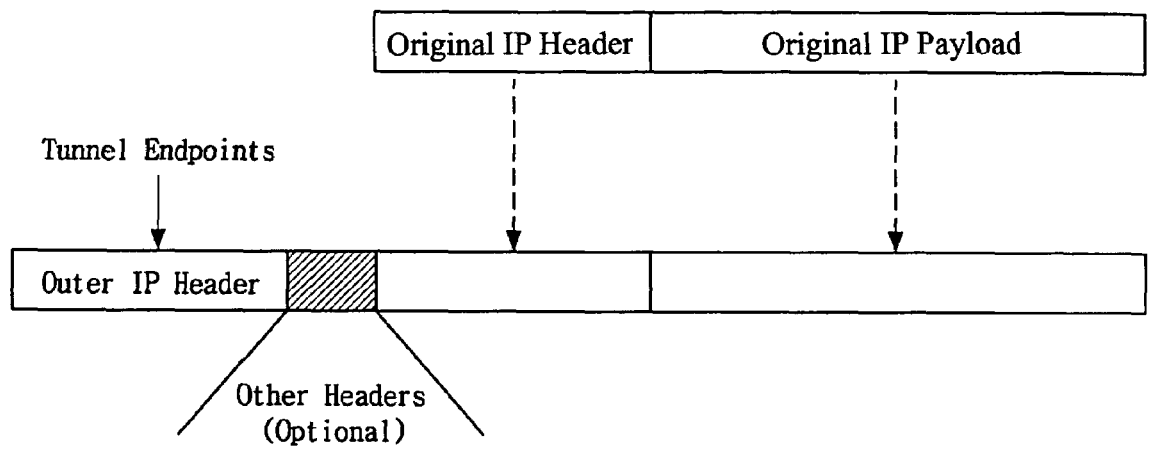
FIG. 12 is a view showing a process of IP-in-IP encapsulation for the IP packet.

As shown in FIG. 11, when the HA performs a tunneling to transfer the packets to COA of the mobile node, encapsulation methods such as an IP-in-IP encapsulation, a minimal encapsulation and a GRE (Generic Record Encapsulation) are used. The packet transferred to a destination of the tunnel through the tunneling is de-capsulated and then transferred to the mobile node. In the case that the destination of the tunnel is the FA, the packet is de-capsulated by the FA and is transferred to the mobile node in the general IP forwarding process. Additionally, in the case that the destination of the tunnel is the mobile node, the packet transferred through the tunnel is de-capsulated by the mobile node and transferred to an upper hierarchy. Here, FIG. 12 is a view showing a process of the IP-in-IP encapsulation for the IP packet.

The construction of the embodiment as described above is a case that the complex wireless terminals 110, 111 and 112 have both phone numbers used in the wired network and in the wireless network.

It is because the HLR 170 used for the terminal authentication and location registration is separately embodied in the wired network and the wireless mobile network. In the case that the complex wireless terminals 110, 111 and 112 receive a call from an external source, it becomes difficult to receive the call through a cheaper network since a caller may not recognize the location of the called. If the HLR of the wireless network and the HLR of the wired network precisely recognize the location of the terminal through an information exchange in order to solve the problem, it can be possible to receive the call through a phone number exchange mutually.

It means that the phone numbers of the complex wireless terminals 110, 111 and 112 are defined as a number, and the caller may memorize one number. Also, there is a method where a service provider of the wired network may share the HLR with a service provider of the wireless network.

Hereinafter, another embodiment of a complex wireless service apparatus using a wired and wireless communication system and a method thereof in accordance with the present invention will be explained with reference to accompanying FIGS. 13 to 17.

Figure 13:
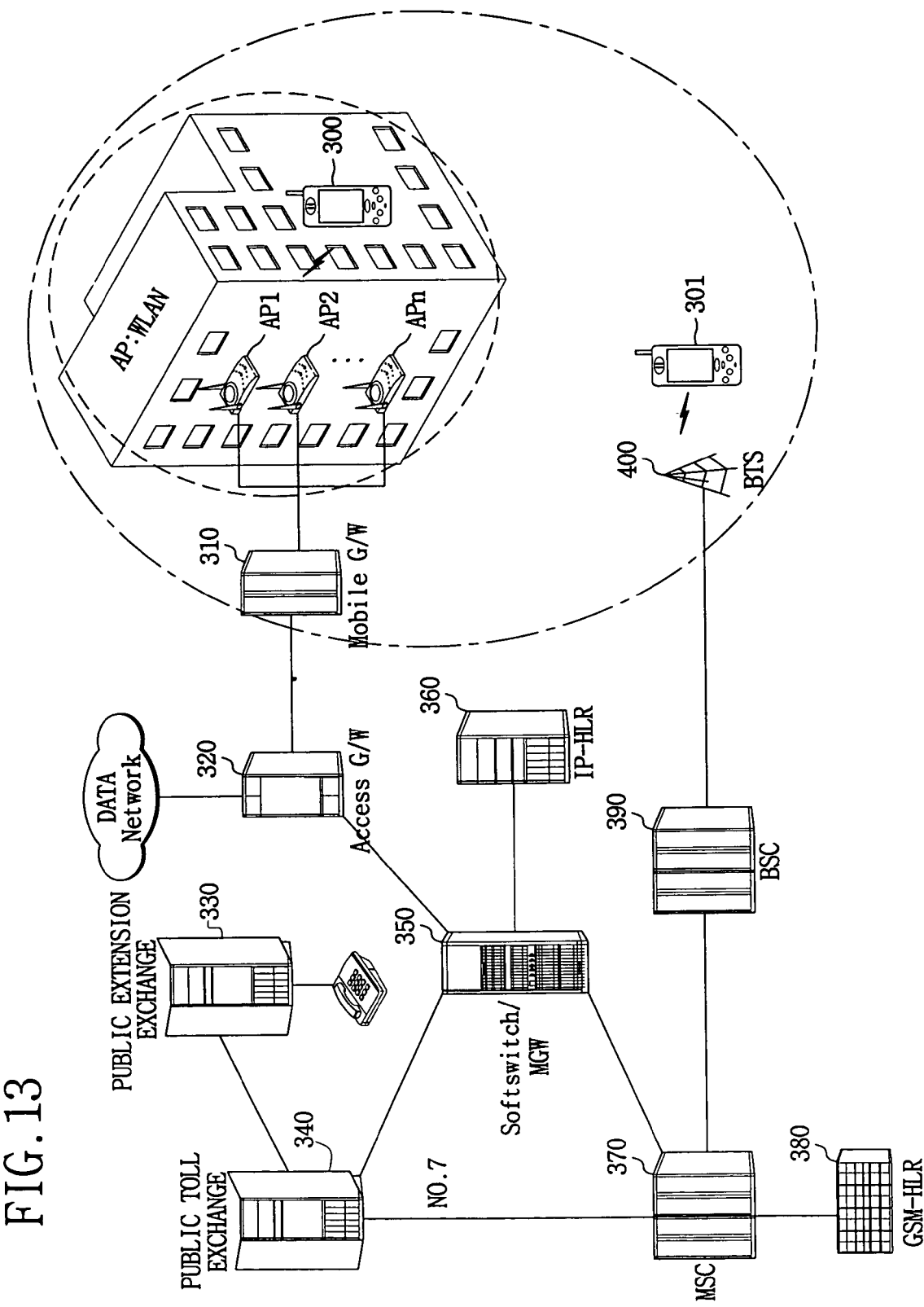
FIG. 13 is another embodiment of the present invention, which is a view showing a construction of a complex wireless service apparatus using a wired and wireless communication system in an office zone.
Figure 14:
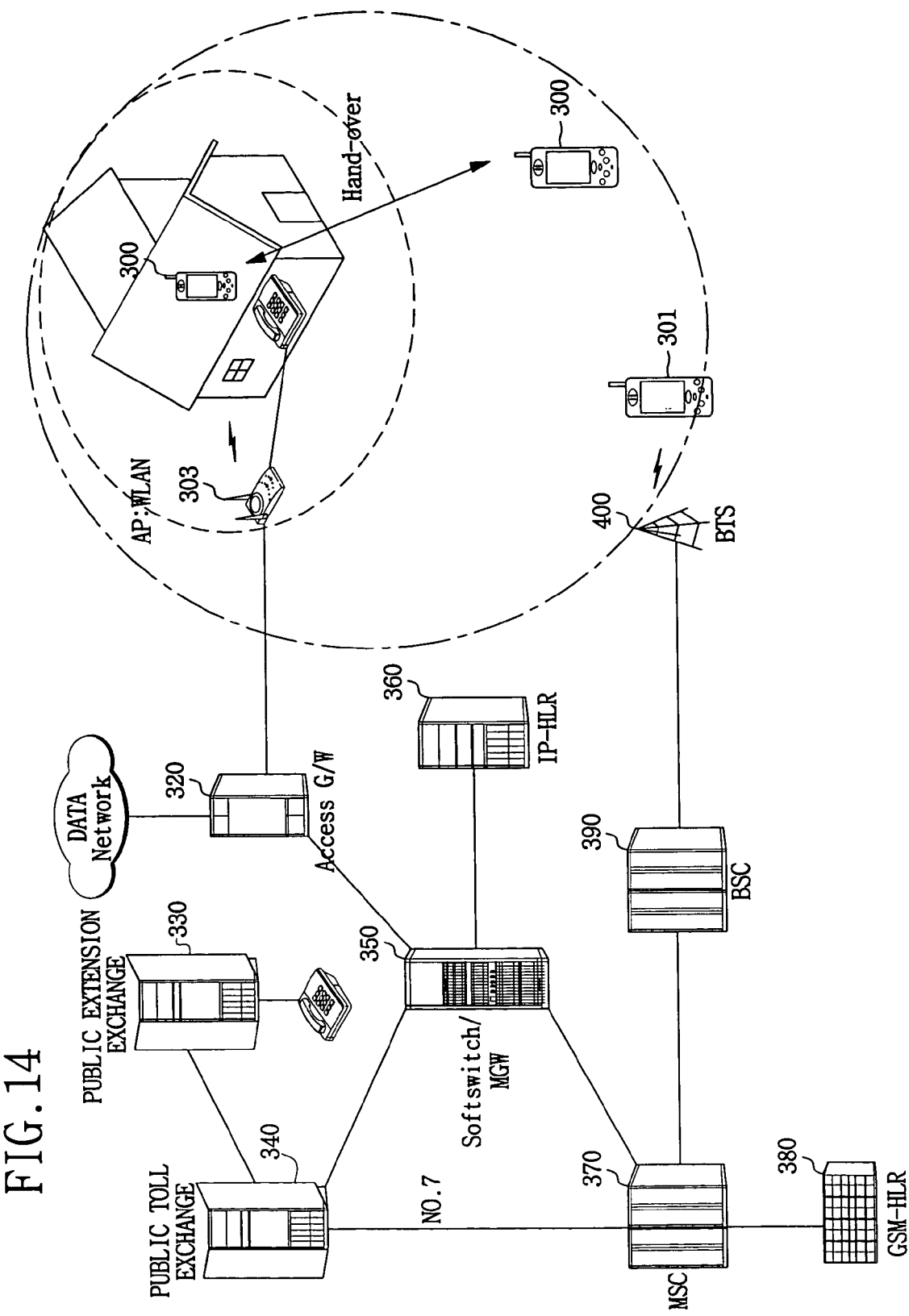
FIG. 14 is another embodiment of the present invention, which is a view showing a construction of a complex wireless service apparatus using a wired and wireless communication system in a home zone.

FIG. 13 is another embodiment of the present invention, which is a view showing a construction of a complex wireless service apparatus using a wired and wireless communication system in an office zone. FIG. 14 is another embodiment of the present invention, which is a view showing a construction of a complex wireless service apparatus using a wired and wireless communication system in a home zone. In FIGS. 13 and 14, explanations for the same constituents overlapped with those of FIGS. 1 to 9 are omitted.

As shown in FIGS. 13 and 14, the complex wireless service apparatus in the office zone includes an access gateway 320, a soft switch/media gateway 350, an IP HLR 360, and a mobile gateway 310. Here, the mobile gateway 310 can be applied only to the office zone complex wireless service apparatus. That is, the mobile gateway 310 manages a plurality of APs (AP1-APn) since there are a plurality of subscribers in the office zone, and can be applied only to the office zone complex wireless service apparatus in order to perform a handoff between the APs.

The access gateway 320 is an IP-DSLAM equipment, which provides a ultra high speed data service in a subscriber side, provides a data service by interconnecting to the data network in a network side, and provides a VoIP service by interconnecting to a softswitch/media gateway 350.

The IP-HLR 360 performs office or home location registration, state management (busy, idle) and subscriber authentication management of the complex wireless terminal subscriber.

The mobile gateway 310 located in the office zone complex wireless service apparatus manages the plurality of APs, and takes part in the handoff between the APs. Also, the mobile gateway 310 is interconnected to the extension public private exchange 330.

As shown in FIG. 13, the public private exchange 330 located in the office zone complex wireless service apparatus is an exchange system, which is generally used when a plurality of extension users wish to use limited office line effectively.

The extension of the public extension exchange 330 is consisted of an analog line and a digital line, which recently provides a wireless solution such as PWT, WDCT, DECT, etc., with solutions which uses WLAN, BLUETOOTH, etc.

Also, the analog line and digital line are used as the office line, and especially the digital line is of various kinds. For example, the digital line includes BRI (Basic Rate Interface), PRI (Primary Rate Interface), xDSL (x Digital Subscriber Line), 10/100 LAN, etc.

The access gateway 320 shown in FIGS. 13 and 14 is a DSL subscriber concentrator, wherein a splitter is located in a subscriber side. The access gateway 320 provides the softswitch/media gateway 350 with data received through the DSL.

The public toll exchange 340 connected to the public extension exchange 330 through a PSTN (Public Switched Telephone Network) line is a general public exchange, which is connected to a plurality of public extension exchanges to be managed integrally.

On the other hand, the BTS 400 in the public network is wirelessly matched with a complex wireless terminal (e.g., 301 and 300) to provide the mobile subscriber with a mobile communication service and to provide voice and data transmitted from the complex wireless terminal to the BSC 390.

The BTS 400 performs functions of constructing a wireless communication line together with the complex wireless terminal included in the communication service area, that is, cell area and managing the wireless resources.

The MSC 370 is a system performing a function of exchanging in the wireless communication network, which performs a role to provide supplementary services by connecting the mobile subscriber to all kinds of supplementary equipment (SMS, VMS, etc.) in the network, or to provide services by connecting the mobile subscriber to the other network.

The MSC 370 exchanges PCM data with BSC 390 and is connected to the public wired exchange to perform a wired exchanging function.

Figure 15:
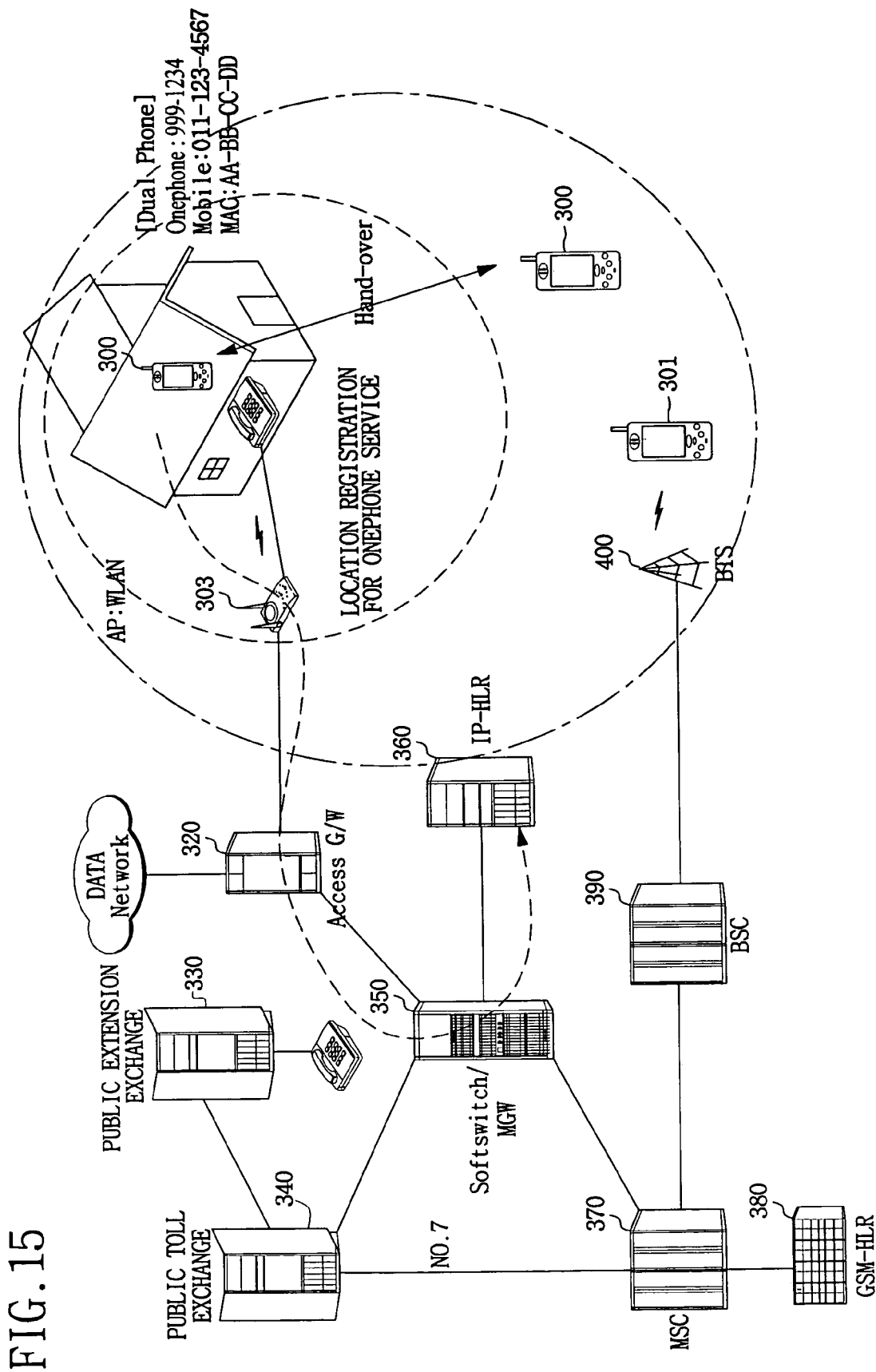
FIG. 15 is a view showing a flow of location registration of the complex wireless terminal in the complex wireless service apparatus shown in FIG. 14.

IP-HLR 360 and GSM-HLR 380 are databases each of which is connected to the private network and public network and stores information on the mobile communication and private network subscribers, which has a construction capable of a perfect fault monitoring and a real time database processing and is interconnected to an exchange center, a short message service center, a network managing center, and a client center to perform functions. Here, a location registration flow of the private network subscriber is shown in FIG. 15. That is, an AP 303 senses a pilot signal of the complex wireless terminal 300 and recognizes a current location of the complex wireless terminal 300 according to the sensed pilot strength. Information on the recognized location of the complex wireless terminal 300 is provided to the access gateway 320, and the access gateway 320 provides the IP-HLR 360 with the information on the location of the complex wireless terminal 300 through the softswitch/media gateway 350 and registers subscriber information of the corresponding complex wireless terminal 300. Here, the subscriber information registered in the IP-HLR 360 is described in Table 2 below.

TABLE 2

| MAC | location | BUSY | IP-PHONE NO | MOBILE NO |
|---|---|---|---|---|
| AA-BB-CC-DD | AP2 | BUSY | 999-1234 | 010-123-4567 |
| AA-BB-AA-EE | AP1 | BUSY | 999-5678 | 010-234-3212 |
| ... | ... | ... | ... | ... |

Also, registration/release of the subscriber information of the public network and private network subscribers and update of all information are performed in the HRLs 360 and 380. Here, representative subscriber information includes current location information of a terminal, roaming information. Moreover, whether a local network service for "one phone service" is supported, whether a local network location is inside or outside, information on a local network usage state, and the public phone number and wireless terminal unique number are made as the database.

The softswitch/media gateway 350 performs the voice and data exchange between a wired network, and wired voice network and wireless data network. The case of using the gateway is used to perform a roaming service between different networks or to perform a call transfer to other networks for a call received by the user.

The complex wireless service method using the complex wireless service apparatus using the wired and wireless communication system constructed as described above will be explained in detail with reference to the accompanying drawings.

Firstly, a processing operation of an outgoing call from the complex wireless terminal 300 will be explained.

At first, when a call is originated from the complex wireless terminal 300 registered in the AP 303 in office or home areas, the call is connected to the PSTN network by way of the AP 303 which supports a connection of a narrowband wireless network (WLAN, BLUETOOTH, UWB) rather than the broadband wireless service usage.

A PIN code is set between the complex wireless terminal 300 and AP 303 used here so that only assigned terminal can be connected to the AP 303.

Also, the AP 303 recognizes a digit received from the complex wireless terminal 300, and determines whether it is an extension communication in the AP 303 or an office line communication and processes the determined communication.

In the case that the PSTN circuit is already occupied and it is not possible to make a communication when a call originating of the complex wireless terminal 300 is tried, a VoIP call is serviced through a data line connected to the AP 303. Of course, in the case that the AP 303 is not connected to the data line, the call is serviced through an external network (CDMA, GSM, GPRS, WCDMA, . . . ).

Hereinafter, the functions described above will be explained in detail with reference to the accompanying drawings.

At first, a call setup is requested from the complex wireless terminal 300 to the AP 303, the AP performs a call service establishment process using a narrowband air protocol, and resource confirmation for the call and an authentication for the terminal.

Moreover, in the case that the user transmitted a phone number for the wired line, that is, a phone number including an area code (for example, 031-**-**) to the AP 303 or the public extension exchange 330 through the complex wireless terminal 300, the AP 303 or public extension exchange 330 determines whether the phone number transmitted from the complex wireless terminal includes the area code.

As a result of the determination, in the case that the digit transmitted from the complex wireless terminal includes the area code, the corresponding area code is detached, and the only digit for a pure phone number of the other party can be transmitted to the public toll exchange 340 through the PSTN line.

Then, incoming and outgoing operations of the complex wireless terminal will be explained with reference to FIG. 13.

Figure 16:
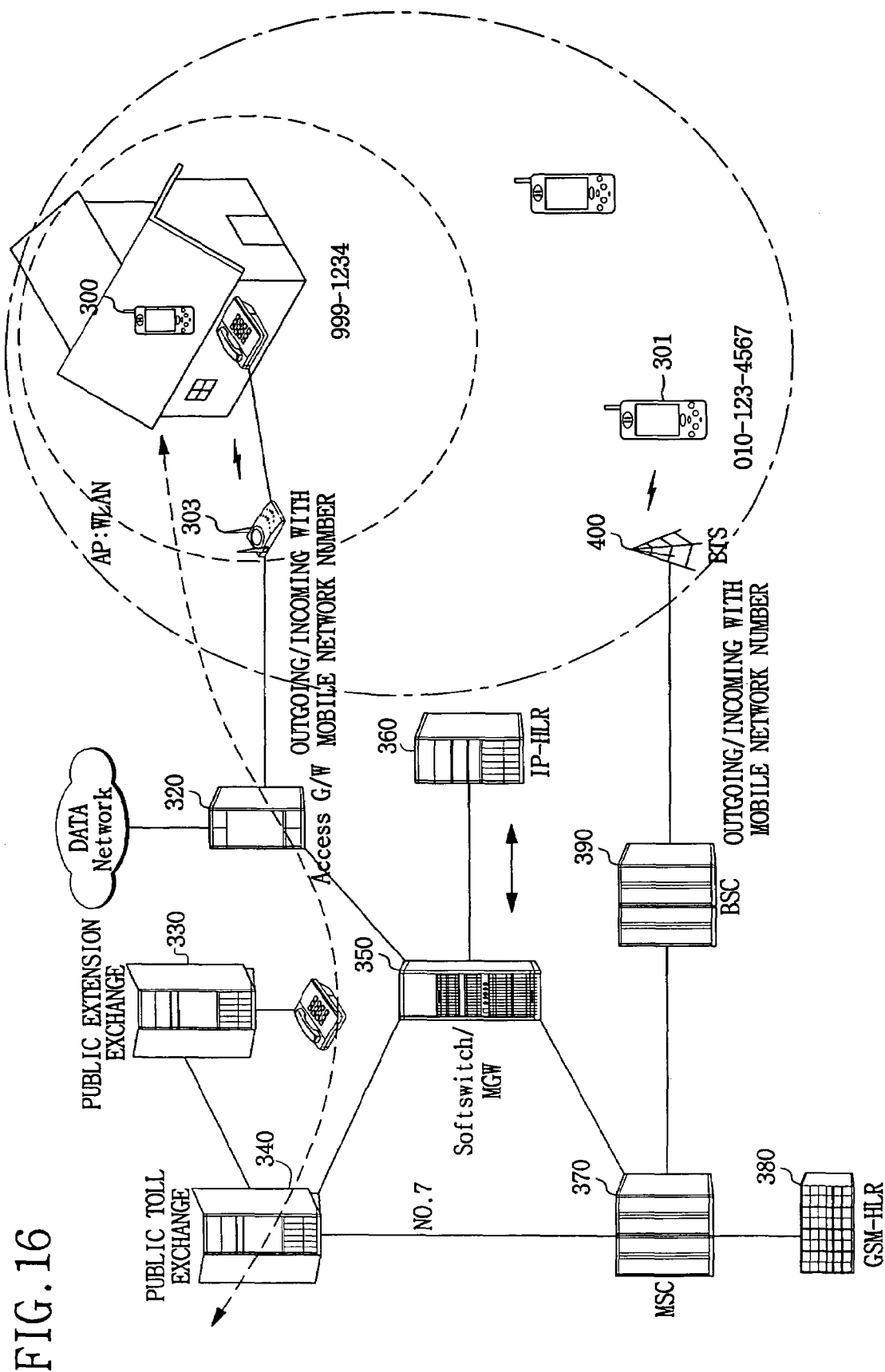
FIG. 16 is a view showing incoming and outgoing flows of a call signal of the complex wireless terminal in the complex wireless service apparatus shown in FIG. 14.

FIG. 16 is a view showing incoming and outgoing flows of a call signal of the complex wireless terminal in the complex wireless service apparatus shown in FIG. 14.

As shown in FIG. 16, when a wireless network of the complex wireless terminal makes a call, an IP is assigned.

In the case that there is an incoming from the MSC 370, when a mobile network number (for example, mobile communication number of 010-123-4567) is received, the MSC 370 provides the BSC 390 with a call incoming signal, and the BSC 390 transmits the call signal to a wireless terminal corresponding to the network number through the BTS 400 to form a call channel.

On the other hand, in the case that there is a call incoming to the MSC 370 with the wireless network number (999-1234), the MSC 370 provides the softswitch/media gateway 350 with the call signal.

The softswitch/media gateway 350 recognizes current location of the complex wireless terminal having the corresponding wireless network number by searching for the IP-HLR 360. In the case that the complex wireless terminal having the corresponding wireless network number is located in the office/home zone, it provides the access gateway 320 with the corresponding call signal, and the access gateway 320 provides the access point with the corresponding call signal to connect the call to the corresponding complex wireless terminal. At this time, the VoIP communication is performed between the softswitch/media gateway 350 and the access gateway 320, and the IP communication is performed between the access gateway 320 and the access point.

Also, voice data transmitted from the softswitch/media gateway 350 to the access gateway 320 is PCM data, and the access gateway 320 transforms the voice PCM data received from the softswitch/media gateway 350 into the IP data and provides the access point 303 with the IP data. As a result, the access gateway 320 transforms the voice signal provided from the wireless terminal into the PCM data in the state that the call is connected between terminals, or the PCM data into the IP data.

On the other hand, an incoming call received from the toll exchange 340 is transmitted to the access point 303 through the softswitch/media gateway 350 and the access gateway 320 in the same method as the operation described above.

On the other hand, a process of processing the incoming call will be explained in the case that the incoming call was received from the PSTN network/data network to the AP.

At first, when the incoming call transmitted from the PSTN line or data network is received at the AP, the AP makes a call to a wired phone connected to the AP (SLT (Single Line Telephone) using the PSTN Line or the VoIP using the data line) and dual mode wireless terminals which support a narrowband, and makes all terminals to perform a simultaneous ringing operation for the incoming call.

In the case that the wired phone connected to the AP extension network or one of the dual mode wireless terminals (One-phones) made a response, the response signal of the corresponding terminal is transmitted to the PSTN or data network. At this time, the AP removes the call of the remaining terminal except for the terminal that has made the response and ends the ringing operation, and performs a call service connection between the terminal that has made the incoming response and the outgoing terminal.

The AP or exchange supporting the narrowband wired network service provides a CID (Caller ID (identification)) with an incoming assignment function, and confirms so-called CID to Onephone DB when an incoming call is requested from the office line and makes an initial incoming call only to the found Onephone terminal. Then, when there is no response for a predetermined time, the AP or exchange enables other terminals to make a service of the incoming call.

A process of performing a call service to a specific terminal using such as CID will be explained.

At first, an incoming of a specific complex wireless terminal (referred to as Onephone terminal, hereinafter) for the received CID is assigned in the database within the AP or private exchange.

After the specific Onephone terminal incoming for the CID is assigned, when the incoming call is received from the PSTN/data network, the AP or private exchange determines whether the received incoming includes the CID. When the received incoming includes the CID, the incoming. Onephone terminal assigned to the database of the AP or private exchange is searched for.

In the case that there exists the Onephone terminal corresponding to the CID for the received incoming call, the corresponding Onephone terminal is called.

In the case that there is a call response from the called Onephone terminal, the AP or private exchange mutually connects the call between terminals and provides a communication service.

That is, when the incoming call is received from the PSTN/data network, the AP or private exchange determines whether the received incoming call includes the CID.

As a result of the determination, in the case that the received incoming call includes the CID, the incoming Onephone terminal assigned to the database of the AP or private exchange is searched for, and it is determined whether there is the incoming assignment terminal, that is, whether there exists the incoming assignment CID.

As a result of the determination, in the case that there exists the incoming assignment Onephone terminal, it is determined whether the corresponding Onephone terminal is located in an Onephone service area. In the case that the corresponding Onephone terminal is located in the Onephone service area, the incoming call service is requested to the incoming assigned Onephone terminal.

In the case that there is a call service response from the corresponding Onephone terminal assigned for incoming when the incoming call service is requested, the call is connected between terminals to perform the communication service.

On the other hand, in the case that there does not exist the incoming assignment Onephone terminal in the database within the AP or private exchange, the incoming assigned corresponding Onephone terminal is not located in the Onephone service area, and there is no call service response from the corresponding incoming assigned Onephone terminal, the incoming call service for all terminals connected to the AP is requested. That is, in the case that all terminals connected to the AP are called and there is a service response from one of the terminals, a communication with the corresponding terminal is made.

In the case that there is no response from all terminals connected to the AP for the call coming from the office line through the wired line (PSTN or Data service network), after CID received at an incoming assigned Onephone terminal which was assigned previously is analyzed, information on the incoming call is transferred with an SMS message or a call transfer service to an assigned terminal is performed. Such a process will be explained, hereinafter.

At first, the SMS service is assigned to a specific Onephone terminal for the received CID in the database within the AP or private exchange. That is, in the case that a call service is requested to a corresponding specific terminal in the state that the call service is assigned to a specific terminal for the received CID, when there is no call service response of the terminal, the SMS service for transmitting the SMS message to the corresponding specific terminal is assigned.

In the state that the SMS service is assigned to a specific terminal, when the incoming call is received through the PSTN or data network, the AP or private exchange determines whether the received incoming call includes the CID.

As a result of the determination, in the case that the corresponding incoming call includes the CID, it is searched from the database whether there exists the incoming assigned Onephone terminal for the corresponding CID.

In the case that there exists the incoming assigned Onephone terminal, the incoming call is requested at the corresponding Onephone terminal.

In the case that there is no response of the assigned terminal according to the incoming call, all terminals connected to the AP are called.

As a result of the call, in the case that there is no response to the call from all the terminals, the SMS message including the CID is transmitted to the SMS assigned Onephone terminal and the SMS message including the CID is transmitted to the other party terminal through the PSTN or data network.

On the other hand, after the SMS message is transmitted, a call transfer service to the assigned terminal is performed, whose process will be explained, hereinafter.

A call transfer service is assigned to a specific Onephone for the received CID in the database within the AP or private exchange.

In the state that the call transfer service is assigned to a specific terminal, when an incoming call is received through the PSTN or data network, the AP or private exchange determines that the received incoming call includes the CID.

As a result of the determination, in the case that the corresponding incoming call includes the CID, it is searched from the database whether there exists the incoming assigned Onephone terminal for the corresponding CID.

In the case that there exists the incoming assigned Onephone terminal, the incoming call is requested at the corresponding Onephone terminal.

In the case that there is no response of the assigned terminal according to the incoming call request, all terminals connected to the AP are called.

As a result of the call, in the case that there is no response to the call from all terminals, the SMS message including the CID is transmitted to the SMS assigned Onephone terminal, and the SMS message including the CID is transmitted to the other party terminal through the PSTN or data network.

Also, the AP or private exchange requests the call transfer service including the assigned specific Onephone terminal information to the public exchange. Accordingly, the public exchange transfers the call to the specific terminal for the call transfer service assigned to the database within the AP or private exchange and performs the call incoming request using the transferred terminal.

Hereinafter, a method for processing a call received from the external network (GSM, CDMA, . . . ) during communication (both of outgoing and incoming) for the PSTN or wired VoIP call through the Onephone terminal will be explained.

At first, in the case that there is an incoming call service request through the PSTN or data network, the AP or private exchange requests the incoming call for the Onephone terminal and the Onephone terminal informs the user that the incoming call was received.

Accordingly, the user hooks-off the Onephone terminal, and the Onephone terminal transmits the response signal for the incoming call to the AP according to the user's hook-off.

The AP transmits the incoming call service response signal to the PSTN or data network (public exchange) according to the incoming response signal transmitted from the Onephone terminal.

Accordingly, a communication for the incoming call with the Onephone terminal is made through the PSTN or data network.

In the case that there is an incoming call service request to the Onephone terminal through a broadband network while the communication is made through the PSTN/data network, the Onephone terminal informs the user of the incoming call information in order that the user can select whether he or she receives the incoming call from the broadband network by displaying the broadband network incoming call service request as a beep or message.

In the case that the user selects an arbitrary key to receive the incoming call from the broadband network, that is, the user responds to the incoming call from the broadband network, the Onephone terminal requests a Hold of the previous call, that is, a call which is operating through the PSTN or data network to the AP.

Accordingly, the AP holds the previous call according to a hold signal to the previous call which is transmitted from the Onephone terminal, and informs the PSTN or data network of the hold of the previous call.

The Onephone terminal performs a communication with the other party terminal through the broadband network by transmitting a response signal for the incoming call transmitted from the broadband network.

After all, when an incoming call occurs from the external network, the terminal itself informs the user of an occurrence of the incoming call through the beep or message.

In the case that the user who has received an incoming call occurrence message pushes a communication button, it is possible to hold an existing call and to respond to a call from the external network. At this time, the user can release the existing call (a call through a wired line) or hold the call. That is, it can be a selection matter or fixed matter of the terminal usage.

Otherwise, a specific key (button) can be prepared, which can remove the existing call and service the call from the external wireless network, and a specific key (button) can be prepared, which acts to disregard a service for a new call.

Then, a hand off process between networks when the Onephone terminal (a complex wireless terminal) moves to another service area (coverage) will be explained with reference to FIG. 17.

Figure 17:
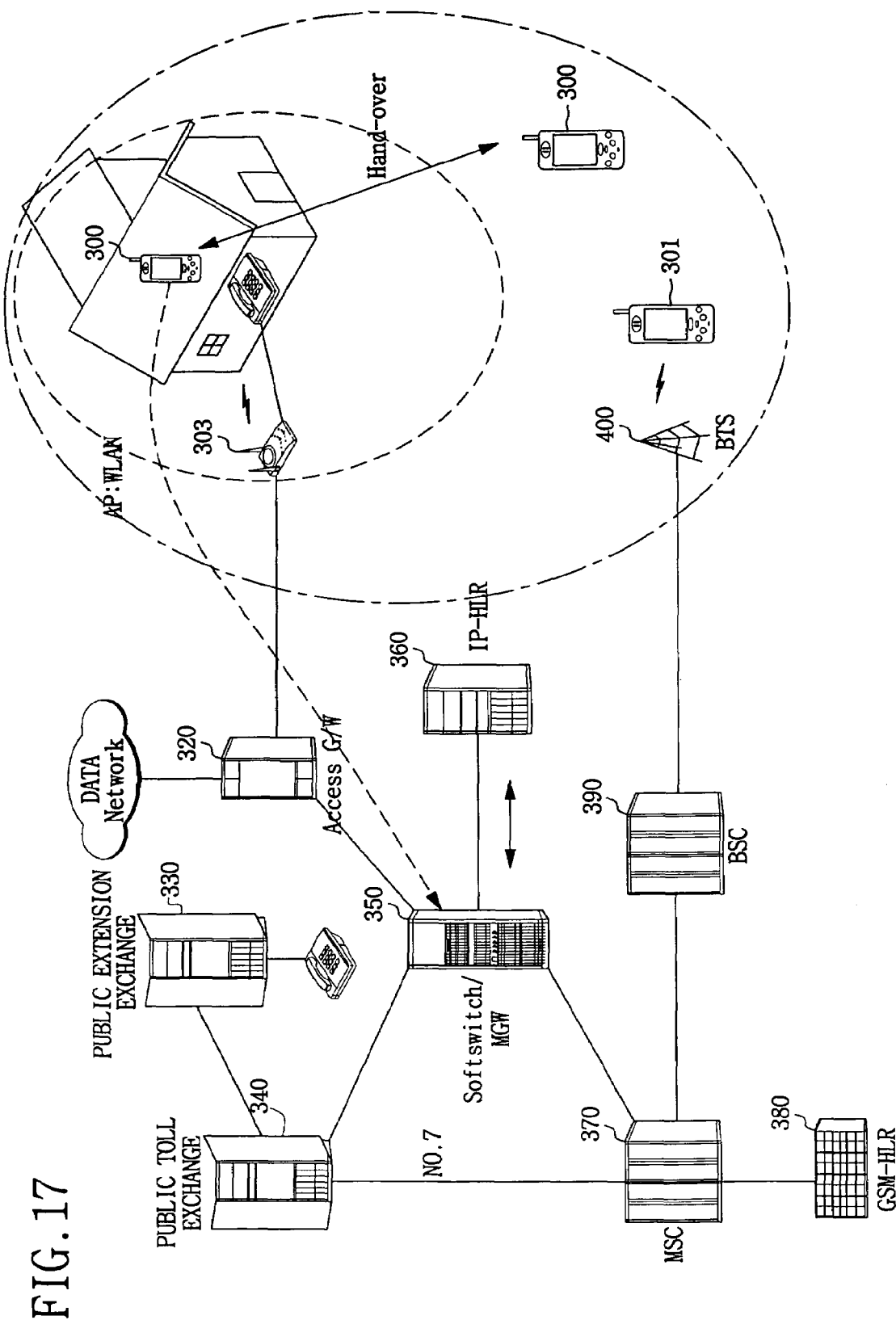
FIG. 17 is a view showing a signal flow for a handoff process of a complex wireless terminal in the complex wireless service apparatus shown in FIG. 14.

FIG. 17 is a view showing a signal flow for a handoff process of a complex wireless terminal in the complex wireless service apparatus shown in FIG. 14.

Firstly, as shown in FIG. 17, when the complex wireless terminal 300 moves from a wireless network, that is, a private network of the office/home to a mobile network while it provides a voice communication or data service, the AP 303 senses the strength of the pilot signal of the complex wireless terminal 300 and recognizes location movement of the complex wireless terminal.

Also, when the complex wireless terminal 300 moves from the mobile network to the private network of the office/home while it receives the voice and data service, the AP 303 senses the strength of the pilot signal of the complex wireless terminal 300. Moreover, as a result of the sense, in the case that it is determined that the complex wireless terminal 300 moved to the service area of the private wireless network, the hand off request signal is transmitted to the softswitch/media gateway 350 through the access gateway 320.

Accordingly, when the softswitch/media gateway 350 requests the call release of the mobile network to the MSC 370 to release the call of the complex wireless terminal 300 to the mobile network, a handoff to the private network is made so that the voice and data service can be provided from the private network.

Here, a call which does not pass through the softswitch/media gateway 350 is not handed off between heterogeneous terminals of the complex wireless terminal. In this case, the call is not disconnected and the service is continuously provided through the mobile network.

On the other hand, when the complex wireless terminal moves from the private network to the mobile network and then moves to another service area of the private wireless network, that is, when the complex wireless terminal moves from a service area A of the private wireless network to the mobile network and then moves to a service area B of the private wireless network, since the IP-HLR 360 recognizes information on the location of the terminal, it is possible to perform a handoff through the softswitch/media gateway 350.

More detailed explanation will be given for such a handoff process.

A call service operation in the case that the Onephone terminal moves from one service area to another service area, for example, from a narrowband service area to a broadband service area will be explained.

The case that the Onephone terminal is out of the narrowband coverage occurs when an RSSI (Radio Signal Strength Indication) level of a pilot (Pilot or Sync.) channel of the narrowband service is lowered, or a data error rate is increased. Whether the Onephone terminal is out of the narrowband service area is determined by assigning proper threshold values to each of the service coverage in each of the above cases.

For example, the area where the Onephone terminal can be located can be divided into an area where it has high RSSI values to the extent that scanning is not needed, an area where an RSSI level of the terminal is scanned, and an area where the Onephone terminal starts to get out of the narrowband. That is, in the case that the area has RSSI value more than a first reference value, the Onephone is determined to be in the corresponding area since the strength of the pilot signal is high, and in the case that the area has an RSSI value less than a second reference value, the corresponding Onephone terminal is determined to be out of the corresponding area since the error rate value is very high. Also, in the case that the area has RSSI value between the first reference value and the second reference value, it is determined that the Onephone is on the way out of the corresponding area so that it is confirmed whether the Onephone is out of the coverage by continuously performing a scanning operation of the Onephone.

In the case that a current call of the Onephone terminal is a voice call when the Onephone terminal moves to another coverage, the user is notified of the coverage breakaway (movement) situation using a voice signal (voice message, beep, melody, . . . ). Additionally, in the case that a current call of the Onephone terminal is a data call (in the case of receiving a data call) when the Onephone terminal moves to another coverage, the user is notified of the situation by displaying message or pictogram on the LCD (Liquid Crystal Display) of the Onephone terminal to indicate the coverage breakaway of the Onephone terminal. Of course, an integrated notification method can be used for each of the voice and data calls.

A mode transfer operation in the case of coverage movement of Onephone terminal will be explained.

In the case that the Onephone moved from an external network to the AP in the narrow band service area, automatic mode transfer of the terminal is performed by means of a searching through periodic signal transfer from the AP to the Onephone terminal, or usage mode transfer (narrow band service or broad band service) can be requested by notifying it to the Onephone terminal.

In the case that the Onephone terminal moved from the AP to the external network (broad band network), when the Onephone terminal cannot receive any signal from the AP, the network operates in an external network connection mode. At this time, an operation to periodically search for whether there is a signal from the AP is performed.

At this time, the case that the Onephone terminal moves to the external network occurs when the signal strength of the AP of the narrowband network is lowered, or the signal or data error rate is increased while the signal strength of the AP is lowered, as described above. They can be obtained in the Onephone terminal and AP according to the method provided in each of the narrowband protocol. When the Onephone terminal gets out of the threshold value of the RSSI and error rate for the service area which was previously assigned, the Onephone terminal is determined to be out of the narrowband service area. Data received from the AP in such a threshold value is determined as data which is not normally used, so that the data is discarded.

A scanning period of the Onephone terminal is determined to make the Onephone terminal to be moved between service networks without having the user known, and has to simultaneously satisfy a method for minimizing power consumption of the terminal.

Hereinafter, a method for scanning the terminal in the case of coverage movement of the Onephone terminal will be explained.

At first, an active scanning duration of the Onephone terminal is at least longer than the paging interval time of the AP (Access Point).

There is a case that the AP does not perform the paging and responds only when the terminal makes a request according to a narrowband service protocol, which does not affect an active scanning duration of the terminal and means that the AP has to wait for the maximum response time of the AP.

Also, when it is determined that the Onephone terminal moved from the narrowband network to the broadband network, the movement is determined according to the RSSI and signal/data frame error rate. Moreover, when it is determined that the Onephone terminal is moved to the broadband network, the scanning period is shortened, and in the case that the Onephone terminal is out of the service area, the scanning period is widened in order to reduce the power consumption of the terminal. That is, the idle time period lengths.

On the contrary, in the case that the Onephone terminal moves from the broadband network to the narrowband network, the Onephone terminal is scanned as done in the broadband since it is not possible to recognize the movement to the narrowband, and when there is at least one of AP scanning, it is determined that the Onephone terminal moves to the narrowband by changing the scanning period.

On the other hand, in the case that the Onephone moved from the broadband network (external network) to the narrowband (AP), the Onephone managing server of the external network is informed of the internal network usage through the AP wired data network in the state that transfer to the AP internal network should be performed, or the Onephone managing server is informed of the internal network usage through the external network before the internal network is used.

Also, when the Onephone moves from the AP to the external network, since the Onephone recognizes that the Onephone is not sensed in the AP, it informs the Onephone managing server that the Onephone moved to the external network, or the Onephone which moved to the external network informs the external network Onephone managing server of the terminal movement through the external network directly.

Hereinafter, a method for performing a data service in a narrowband service network using the Onephone terminal is explained.

At first, a method of registering an initial Onephone terminal in the narrowband service network will be explained.

At first, the narrowband service AP is established as a registrable mode.

Next, the Onephone terminal requires the user to input a registration system ID (identification) or information on a user's ID or a password.

When all kinds of information for registering the Onephone terminal is inputted from the user, the Onephone terminal transmits the inputted information to the AP, and the AP performs a narrowband network registration process according to all the kinds of information transmitted from the Onephone terminal.

The AP stores information on the registration Onephone terminal and establishes the narrowband service AP as a registration release mode.

On the other hand, a method for using a wired data network is explained after the Onephone terminal is registered in the narrowband network through the process described above.

It is a service available method in the case that the AP or private exchange supporting the Onephone terminal service has a circuit except for the PSTN interface, to which data service can be provided.

Firstly, all Onephone terminals may have a temporary (dynamic) IP (Internet Protocol address) or a fixed (static) IP through an IP assignment process in order to use the data service if possible.

In the process of obtaining that, an authentication for the Onephone terminal can be performed, wherein the method used to make the authentication uses a PPP (point-to-point protocol) so that the user's ID and password are exchanged (authentication flow such as PAP, CHAP), an authentication of the terminal or user is performed, a data session is opened between the Onephone and the wired data service network, and an "Account_start" for the data session can be performed.

On the contrary, even though there may be a case that a separate authentication protocol can be used after assigning the IP through DHCP (Dynamic Host Configuration Protocol), this case includes a case that encryption and authentication are performed together in the Layer 3 level. The encryption used at this time may be 802.1x and so on.

On the other hand, the user of the Onephone can be connected to a wired data service network by placing an independent hot key in the Onephone or using a menu key and an item key on the sub-menu in order to provide a data service.

The user of the Onephone can be connected to the wired contents server (for example, an application server) through the connected wired network and provide a game and bell sound through a contents server in this case. The public network makes the Onephone user connected to the contents server of the wired network and provides a specialized home networking service of the user (for example, Home view, appliance control service, etc.)

On the other hand, while attached FIGS. 13 to 17 explain the case of the HLR being installed in each of the mobile network and private wireless network, only one HLR used to register information on the subscriber and location of the complex wireless terminal is constructed, information on the private wireless network and location of the mobile network is stored and registered together in one HLR, and the incoming call is transferred to the corresponding network according to information on the location of the corresponding terminal registered in the HLR when the voice and data call services are requested from the complex wireless terminal. Such an embodiment makes it possible to provide the voice and data services to the corresponding terminal where the private wireless network and mobile network are located using a true Onephone, that is, a terminal number.

In other words, when an incoming request signal is received from the complex wireless terminal, it is possible to provide the voice and data services of the private wireless network and mobile network using one terminal number by obtaining information on a location of the corresponding terminal from the HLR (Home Location Register) and transferring the corresponding incoming call to a network corresponding to location information of the terminal. Here, the HLR may be installed in the private wireless network or in the mobile network.

There is provided a complex wireless service apparatus using a wired and wireless communication system and a method thereof in accordance with the present invention, wherein when a call is not reachable in one network in the complex wireless terminal, the call can be received through another network, and the service user can make a communication without any disconnection by providing a hand off between networks for the complex wireless terminal when the user moves from one network to another network during making a call.

Also, on transmitting an outgoing phone number and an extension number from a mobile switching center to a wired and wireless complex gateway, the numbers are easily transmitted using an outgoing phone display function, and a usage convenience of the complex wireless terminal can be enhanced by providing a handoff for plural band and plural mode of the complex wireless terminal and then guaranteeing mobility.

Also, the user can save a communication charge by automatically providing a service for the complex wireless terminal through an extension wireless network, and a demand for the complex wireless terminal can be generated by providing a handoff between networks for the complex wireless terminal and overcoming a defect of the complex wireless terminal.

The present invention can also be realized as computer-executable instructions in computer-readable media. The computer-readable storage media includes all possible kinds of media in which computer-readable data is stored or included or can include any type of data that can be read by a computer or a processing unit. The computer-readable storage media include for example and is not limited to storage media, such as magnetic storage media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, and other semiconductor media, electronic media, electromagnetic storage media and infrared storage media. The data stored in the computer-readable media may be transmitted via a communication medium such as carrier waves (e.g., transmission via the Internet or another computer). The transmission paths of the communication medium generally carry computer-readable instructions, data structures, program modules or other data in a modulated signal such as the carrier waves or other transportable mechanism including any information delivery media. Computer-readable data stored on the computer-readable storage media may also be transmitted via wireless media such as radio frequency, infrared microwaves, and through wired media such as a wired network. Also, the computer-readable storage media can store computer-readable codes that are distributed in computers connected via a network. The computer readable storage medium also includes cooperating or interconnected computer readable media that are in the processing system or are distributed among multiple processing systems that may be local or remote to the processing system. The present invention can include the computer-readable storage medium having stored thereon a data structure including a plurality of fields containing data representing the techniques for the practice of the principles of the present invention.

Figure 18:
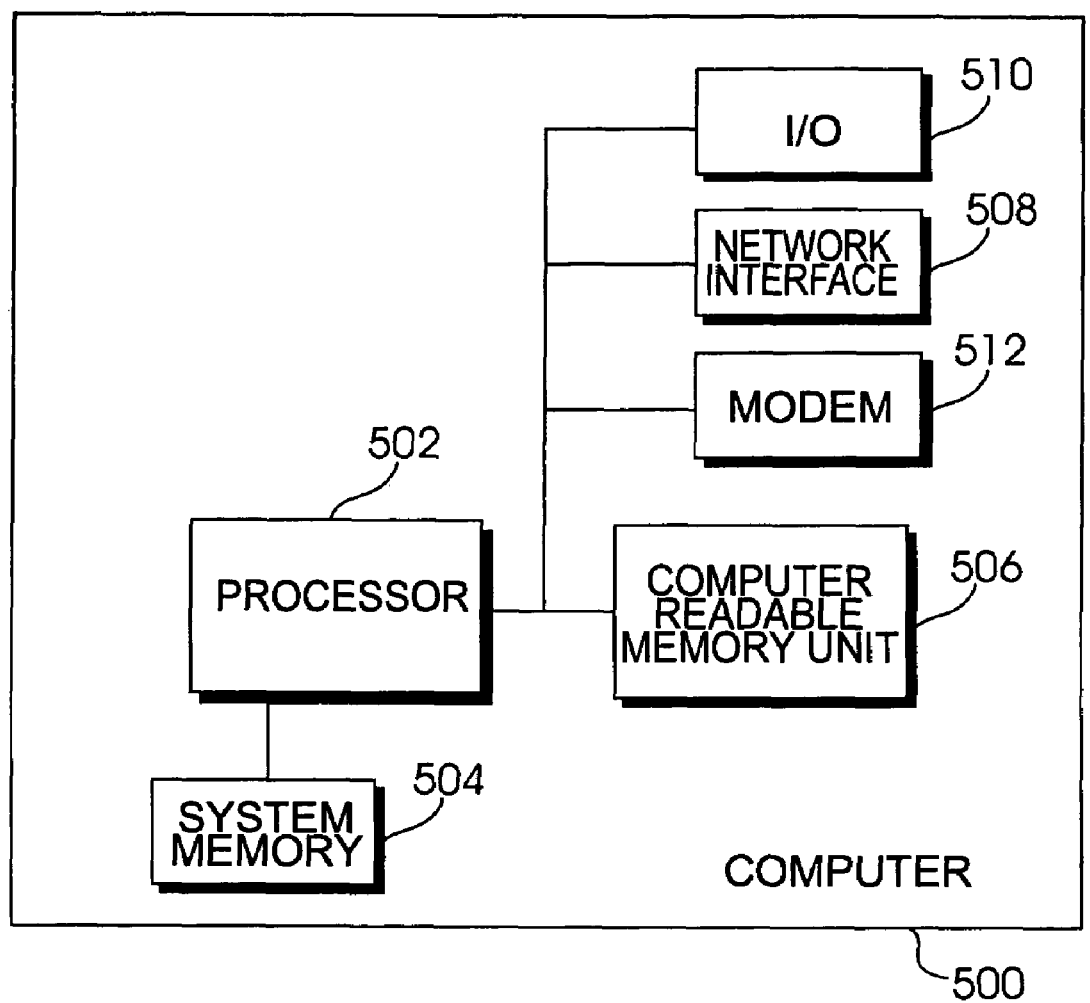
FIG. 18 shows an example of a computer including a computer-readable medium having computer-executable instructions for performing a technique of the present invention.

An example of a computer, but not limited to this example of the computer, that can read computer readable media that includes computer-executable instructions of the present invention is shown in FIG. 18. The computer 500 includes a processor 502 that controls the computer 500. The processor 502 uses the system memory 504 and a computer readable memory device 506 that includes certain computer readable recording media. A system bus connects the processor 502 to a network interface 508, modem 512 or other interface that accommodates a connection to another computer or network such as the Internet. The system bus may also include an input and output interface 510 that accommodates connection to a variety of other devices.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A complex wireless service apparatus using a wired and wireless communication system, the apparatus comprising:
   a home location register for storing a database including information representing a mobile communication phone number for a complex wireless terminal which supports plural band service and plural mode service, including information indicating whether the complex wireless terminal is located inside or outside an extension wireless service area, including information representing a public phone number for the complex wireless terminal, and including information representing a wireless terminal unique number for the complex wireless terminal;
   a mobile switching center for performing an extension location registration for the complex wireless terminal in the home location register when the extension location registration is requested by the complex wireless terminal, and, when an incoming request is made in the complex wireless terminal, trying to connect the incoming request by using the public phone number of the complex wireless terminal and wireless terminal unique number when the complex wireless terminal is located in the premises by referencing the database stored in the home location register and trying to connect the incoming request by using the mobile communication phone number when the complex wireless terminal is located in a mobile communication service area; and
   a wired and wireless complex gateway for trying to connect the incoming request with the complex wireless terminal using the wireless terminal unique number transmitted from the mobile switching center through the public exchange when the incoming request including the wireless terminal unique number for the complex wireless terminal is made from the mobile switching center.

2. The apparatus according to claim 1, wherein the complex wireless terminal includes a high frequency unit for supporting the plural band service and a base band unit for supporting the plural mode service and supports the plural service and plural service among code-division multiple access, group special mobile, wideband code division multiple access, wireless local area network, and BLUETOOTH communication methods.

3. The apparatus according to claim 2, wherein the complex wireless terminal periodically monitors strength of a pilot signal of the other system when a system provides a service by obtaining signals of the plural band service and plural mode service from a corresponding system in an idle state to collect information and confirming whether the system is serviced, and, when the complex wireless terminal moves from a mobile communication service area to an extension wireless network service area, when a pilot signal of an access point in the extension wireless network service area is sensed, registers the mobile switching center in the home location register by transmitting an access point pilot signal sensing message to the mobile switching center.

4. The apparatus according to claim 1, wherein the home location register stores whether the extension service for the complex wireless terminal is supported in the database to manage, and the mobile switching center confirms information on a location of the complex wireless terminal registered in the home location register when there is an incoming request for the complex wifeless terminal, and tries the incoming using a public phone number of the complex wireless terminal and a wireless terminal unique number when the complex wireless terminal is located in the premises and the extension service can be supported.

5. The apparatus according to claim 1, wherein an incoming request including the wireless terminal unique number for the wired and wireless complex gateway of the mobile switching center enables the mobile terminal unique number and outgoing number to be transmitted to the wired and wireless complex gateway using an outgoing phone display service by the mobile switching center.

6. A complex wireless service apparatus using a wired and wireless communication system, the apparatus comprising:
   a home location register for storing a database of information representing a mobile communication phone number for a complex wireless terminal which supports plural band service and plural mode service, information indicating whether the complex wireless terminal is located inside or outside an extension wireless service area, information representing a public phone number for the complex wireless terminal, and information representing a wireless terminal unique number for the complex wireless terminal;
   a mobile switching center for providing, when the complex wireless terminal moves to an extension wireless service area and requests location registration while making a communication with the base station transceiver subsystem through a base station controller, a communication without any disconnection by registering an extension-location for the complex wireless terminal in the home location register and providing an extension wireless network using a public phone number and a unique number of the complex wireless terminal, and, for providing, when the complex wireless terminal moves to a mobile communication service area and requests an extension location registration cancellation while making a communication to a public exchange through an extension wireless service network, a communication without any disconnection by performing the extension location registration cancellation for the complex wireless terminal in the home location register and providing a mobile communication service to a base station transceiver subsystem for the complex wireless terminal through the base station controller; and
   a wired and wireless complex gateway for establishing a communication line to the complex wireless terminal using a wireless terminal unique number transmitted from the mobile switching center through the public exchange when a communication line establishment request including the wireless terminal unique number for the complex wireless terminal is made from the mobile switching center.

7. The apparatus according to claim 6, wherein the complex wireless terminal includes a high frequency unit for supporting plural bands and a base band unit for supporting plural modes and supports plural bands and plural modes among code-division multiple access, group special mobile, wideband code division multiple access, wireless local area network, and BLUETOOTH communication methods.

8. The apparatus according to claim 7, wherein the complex wireless terminal periodically monitors strength of a pilot signal of the other system even when a system provides a service by obtaining signals of the plural bands and plural modes from a corresponding system in an idle state to collect information and confirming whether the system is serviced, and, in the case that the complex wireless terminal moves from a mobile communication service area to an extension wireless network service area, when a pilot signal of an access point in the extension wireless network service area is sensed, registers the mobile switching center in the home location register by transmitting an access point pilot signal sensing message to the mobile switching center.

9. A complex wireless service method, comprising:
performing, at a wired and wireless communication system including a complex wireless terminal for supporting plural band service and plural mode service, a home location register for storing information indicating whether the complex wireless terminal is located inside of or outside of an extension wireless service area, a mobile switching center for providing the complex wireless terminal with an automatic call forwarding and handoff, and a wired and wireless complex gateway for providing a communication through an extension wireless service network, location registration in the home location when the mobile switching center receives a location registration signal from the complex wireless terminal;
confirming, when there is an incoming request for the complex wireless terminal, whether a location of the corresponding complex wireless terminal is registered in the mobile communication service area using the home location register by the mobile switching center; and
providing, when the location of the complex wireless terminal is registered in the mobile communication service area as a result of the confirmation, communication through a base station controller and a base station transceiver subsystem by trying to connect the incoming request to the complex wireless terminal by using a mobile communication phone number, and when the location of the complex wireless terminal is registered in the extension wireless network service area as a result of the confirmation, the communication through a public exchange by trying to connect the incoming request to the complex wireless terminal by using a public phone number and a wireless terminal unique number.

10. The method according to claim 9, wherein the step of providing the communication comprises the sub-steps of:
maintaining the communication when the complex wireless terminal moves to the extension wireless network service area while making a communication and requests extension location registration; and
releasing the call and performing the extension location registration in the complex wireless terminal when the call is completed.

11. The method according to claim 9, wherein the step of providing the communication comprises the sub-steps of:
performing extension location registration by the mobile switching center when the complex wireless terminal moves to an extension wireless network service area and requests the extension location registration; and
releasing a communication establishment to the complex wireless terminal through the base station controller and base station transceiver subsystem and providing a communication through an extension wireless network whose location is registered by way of the public exchange by the mobile switching center.

12. The method according to claim 9, wherein the step of maintaining the communication when the complex wireless terminal moves to the extension wireless network service area, comprises the sub-steps of:
performing location registration by the mobile switching center when the complex wireless terminal moves to a mobile communication service area and requests the location registration; and
releasing a communication establishment to the complex wireless terminal through the public exchange and an extension wireless network and providing a communication by way of a base station controller and a base station transceiver subsystem by the mobile switching center.

13. A complex wireless service apparatus using a wired and wireless communication system, the apparatus including:
an access point which uses a narrow band wireless protocol, connectable to a digital subscriber line access multiplexer in a first area and a private exchange in a second area through a wired and wireless complex gateway in the access point according to a wired network construction connected from a public network or a private network, to assign a network connection channel by selectively transmitting information to one or more internal terminals connected to internal part of the complex wireless terminal or private network or transmitting paging information for a terminal incoming, and receiving a connection signal from the wireless complex terminal, providing a gateway function through a public switched telephone network connection, an local area network connection function through an arbitrary wired communication line connection and a handoff function between access points installed in the private network, and transmitting or receiving a call signal to or from all terminals connected to the private network;
an access gateway comprising an Internet protocol-digital subscriber line access multiplexer equipment, providing a subscriber with an ultra high speed data service, providing a network with a data service by interconnecting to a data network, and performing a voice over Internet protocol service to the complex wireless terminal by interconnecting to a voice over Internet protocol network;
a home location register comprising a database installed in each of the private and public networks and storing information for the public or private network subscriber, having a construction capable of a perfect defect monitoring and a real time database processing, and performing registration and cancellation of information on a private or public subscriber and the complex wireless terminal and an update of all information; and
a softswitch and media gateway for being located in the private network and managing a plurality of access points in the private network, performing private network location registration of the complex wireless terminal in the home location register, performing a handoff of the complex wireless terminal between the private network and the mobile network, performing voice and data exchanges among the wired network, private wireless network and wireless data network, performing a roaming among different networks, and performing a transfer of a call received from the user to different network.

14. A computer-readable storage medium having computer-executable instructions for performing a method, comprising:
performing location registration in a home location register when a mobile switching center receives a location registration signal from a complex wireless terminal;

confirming, when there is an incoming request for the complex wireless terminal, whether a location of the corresponding complex wireless terminal is registered in the mobile communication service area using the home location register by the mobile switching center; and providing, when the location of the complex wireless terminal is registered in the mobile communication service area as a result of the confirmation, a communication through a base station controller and a base station transceiver subsystem by trying to connect an incoming to the complex wireless terminal using a mobile communication phone number, and when the location of the complex wireless terminal is registered in an extension wireless network service area as a result of the confirmations, the communication through a public exchange by trying to connect the incoming to the complex wireless terminal using a public phone number and a wireless terminal unique number.

15. The computer-readable storage medium having computer-executable instructions for performing the method of claim 14, wherein the step of providing the communication comprises of:

maintaining the communication when the complex wireless terminal moves to an extension wireless network service area while making a communication and requests extension location registration; and releasing the call and performing the extension location registration in the complex wireless terminal when the call is completed.

16. The computer-readable storage medium having computer-executable instructions for performing the method of claim 14, wherein providing the communication comprises of:

performing extension location registration by the mobile switching center when the complex wireless terminal moves to the extension wireless network service area and requests the extension location registration; and releasing a communication establishment to the complex wireless terminal through the base station controller and base station transceiver subsystem and providing a communication through an extension wireless network whose location is registered by way of the public exchange by the mobile switching center.

17. An apparatus, comprising:

a mobile switching center determining whether an access point is provided with an extension wireless network service for a plurality of wireless terminals with reference to registration information and performing an extension location registration when the access point is provided with an extension wireless network service for the wireless terminals by using identification information of the wireless terminals, said wireless terminals being mobile terminals supporting plural bands and plural modes; and a gateway providing a connection between an extended network and a public network, a connection with a wired terminal through a wire when a service is requested for a wired subscriber from the public network, and a connection with the plurality of wireless terminals through the access point when a service is requested for the wireless terminal by using the identification information of the wireless terminal transferred from said mobile switching center when the incoming request includes the identification information for the wireless terminal.

18. The apparatus of claim 17, further comprised of said gateway providing a service through a public network by way of a public exchange when said gateway requests to be connected with the public phone network in an extended network, said gateway tries to receive a call through the access point when said gateway receives a forwarding request for an extended number of the wireless terminals, when said gateway fails to receive the call, said gateway transmits an absent subscriber message, or try to receive the call with a mobile communication phone number of the wireless terminals using information on a location registration of the wireless terminals transmitted from a home location register.

19. The apparatus of claim 17, with said mobile switching center performing the extension location registration for the wireless terminal in a register when the extension location registration is requested by the wireless terminal, and, when an incoming request is made in the wireless terminal, trying to connect the incoming using a public phone number of the wireless terminal and identification information when the wireless terminal is located in a certain area with reference to the register and trying to connect the incoming using a mobile communication phone number when the wireless terminal is located in a mobile communication service area.

20. The apparatus of claim 19, further comprised of said gateway for trying to connect the incoming with the wireless terminal using a wireless terminal unique number as the identification information transmitted from the mobile switching center through the public exchange when the incoming request including the wireless terminal unique number for the wireless terminal is made from said mobile switching center.

21. The apparatus of claim 17, wherein when an incoming call request for said wireless terminals located in an extended wireless network service is received through a mobile communication phone number, said mobile switching center confirming whether an extended wireless network can be currently serviced for said wireless terminals and transfers the incoming call to the corresponding extended wireless network.

22. The apparatus of claim 17, when said mobile switching center receives a forwarding request of a mobile communication phone number of said wireless terminals, providing a call forwarding in order to provide an extended wireless network service.

23. The apparatus of claim 17, when the incoming call is incoming from said mobile communication network during an extended service, said gateway transmitting a busy message instead of the wireless terminals transmitting the busy message.

24. The apparatus of claim 17, wherein when the wireless terminals move from an extension wireless network service area to a mobile communication network service area, the wireless terminals sensing a pilot signal of the mobile communication network and inform said mobile switching center of their movement through a base station transceiver subsystem and a base station controller, said mobile switching center being connected with the base station controller, and the base station controller being connected with the base station transceiver subsystem.

25. The apparatus of claim 17, wherein when one of the wireless terminals moves from an extension wireless network service area to a mobile communication network service area, said gateway receives the location information for the wireless terminals from said mobile switching center and converts the service into other extension wireless networks where the wireless terminals are located or into the mobile communication network where the wireless terminals are located.

26. The apparatus of claim 17, wherein when the wireless terminals located in an extension wireless network service area receive the outgoing call for other mobile communication network service subscribers, said gateway provides a communication through a public exchange, a toll exchange and said mobile switching center.

27. The apparatus of claim 17, wherein when one of the wireless terminals moves from an extension wireless network service area to a mobile communication network service area, said mobile switching center provides a communication without any interference when it is sensed that the wireless terminals moved from the extension wireless network service area to the mobile communication network service area, the communication without any interference being provided by when said mobile switching center is interconnected to a public phone for the wireless terminals and senses that the wireless terminal moved to the mobile communication service area, it is sensed using a mobile communication network pilot sensing message received from the wireless terminal, while providing a communication service, a communication line to the wireless terminals is established through a base station controller and a base station transceiver subsystem.

28. The apparatus of claim 17, with said gateway further comprising:
a trunk connection unit connected to an exchange;
a switching unit connected with said trunk connection unit and providing for switching;
a subscriber connection unit connected with said switching unit and the subscribers; and
a control unit connected with said trunk connection unit, said switching unit and said subscriber connection unit, said control unit manages a subscriber and a database, which analyzes signals received from said subscriber connection unit and said trunk connection unit and then requests a connection to said switching unit, when said control unit receives a service request for a wireless subscriber from the exchange through said trunk connection unit, said control unit controls said switching unit and said subscriber connection unit and then establishes a communication line to one of said wireless terminal.

29. The apparatus of claim 17, with said wireless terminal comprising:
a high frequency unit supporting the plural bands, said high frequency unit including a duplexer, a receiver, a transmitter, a middle frequency processing unit of receiving side and a middle frequency processing unit of transmitting side.

30. The apparatus of claim 29, with said wireless terminal further comprising:
a base band unit supporting the plural modes, and including said base band processing unit and a memory.

31. An apparatus, comprising of:
a register storing a database of information representing a mobile communication phone number for a complex wireless terminal supporting plural band and plural mode, information indicating whether the complex wireless terminal is located inside or outside an extension wireless service area, information representing a public phone number, and information representing a wireless terminal unique number;
a mobile switching center for performing an extension location registration for the complex wireless terminal in the home location register when the extension location registration is requested by the complex wireless terminal, and, when an incoming request is made in the complex wireless terminal, trying to connect the incoming using the public phone number of the complex wireless terminal and wireless terminal unique number when the complex wireless terminal is located in a certain area with reference to said register and trying to connect the incoming using the mobile communication phone number when the complex wireless terminal is located in a mobile communication service area;
a gateway for frying to connect an incoming with the complex wireless terminal using the wireless terminal unique number transmitted from said mobile switching center through the public exchange when the incoming request including the wireless terminal unique number for the complex wireless terminal is made from the mobile switching center;
a packet data serving node and foreign agent being interconnected to abase station controller and said gateway, assigning a mobile Internet protocol for a data service to the complex wireless terminals and establishing a point to point protocol according to the mobile Internet protocol assignment accommodating a data communication with an Internet protocol network; and
a home agent managing a plurality of the foreign agents, and maintaining the mobile Internet protocol accommodating the data service being serviced without communication disconnection when the complex wireless terminals move to other service areas.

32. The apparatus of claim 31, wherein when the wireless terminals are assigned a mobile Internet protocol and a data service is requested from the wireless terminals, the request signal is provided to said gateway through an access point.

33. The apparatus of claim 31, wherein said gateway transmitting the data request signal requested through an access point to the packet data serving node and foreign agent and connected to the Internet through said packet data serving node to provide data service to a user.

34. The apparatus of claim 31, wherein when a data service is requested in the complex wireless terminals, both an Internet connection through an extension Intranet and a connection through a public network packet data serving node is provided, where said packet data serving node is interconnected to said gateway and the base station controller.

35. The apparatus of claim 31, wherein when the data service incoming in the complex wireless terminals, the incoming request of the current location of the corresponding terminal is made to the corresponding base station transceiver subsystem or said gateway obtained through said register by managing a mobile Internet protocol assigned in said packet data serving node and foreign agent.

36. The apparatus of claim 35, wherein the data service, when the wireless terminal is handed-off, mobility of the terminal to which a mobile Internet protocol is assigned is guaranteed and the terminal is serviced through said packet data serving node.

37. The apparatus of claim 31, wherein when receiving the data service and when the wireless terminal is out of the service area of the extension network, the register changes the location registration of the corresponding terminal, and the packet data serving node and foreign agent is assigned another mobile Internet protocol of the corresponding terminal.

38. The apparatus of claim 31, with said home agent tunneling the data received through the mobile Internet protocol registered in the first extension network to a mobile Internet protocol newly registered through a location movement to the public network accommodating the providing of the data service to the corresponding wireless terminal without data service interference.

39. A method, comprising of:
receiving an incoming call for a complex wireless terminal having plural bands and plural modes;
confirming a location of the complex wireless terminal;
determining whether the location of the complex wireless terminal is in an extension network or a mobile communication network;
transmitting the incoming signal to a wired and wireless complex gateway when the location is the extension network and establishing the call;
determining whether the complex wireless terminal moves into the extension network when the location is determined to be the mobile communication network; and
when the complex wireless terminal moves to the extension wireless network service area, a mobile switching center maintaining the call passing through the mobile communication network and releasing the call when the call is completed and, registering the new location.

* * * * *